United States Patent
Bhise et al.

(10) Patent No.: US 11,989,627 B1
(45) Date of Patent: May 21, 2024

(54) AUTOMATED MACHINE LEARNING PIPELINE GENERATION

(71) Applicant: Amazon Technologies, Inc., Seattle, WA (US)

(72) Inventors: Aditya Vinayak Bhise, Seattle, WA (US); Harnish Botadra, Seattle, WA (US); Jae Sung Jang, Seattle, WA (US); Jakub Zablocki, Seattle, WA (US); Jianbo Liu, Seattle, WA (US); Nikolay Kolotey, Seattle, WA (US); Prince Grover, Seattle, WA (US); Tanay Bhargava, Seattle, WA (US); Thiago Goes Arjona, Seattle, WA (US); Christopher Zachariah Jost, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 815 days.

(21) Appl. No.: 16/915,871

(22) Filed: Jun. 29, 2020

(51) Int. Cl.
*G06N 20/00* (2019.01)
*G06F 18/21* (2023.01)
(Continued)

(52) U.S. Cl.
CPC ......... *G06N 20/00* (2019.01); *G06F 18/2113* (2023.01); *G06F 18/2163* (2023.01);
(Continued)

(58) Field of Classification Search
CPC .......... G06N 20/00; G06N 5/025; G06N 5/04; G06N 5/046; G06F 18/217; G06F 18/2163; G06F 18/2113
See application file for complete search history.

(56) References Cited

U.S. PATENT DOCUMENTS

| 7,203,685 | B2 * | 4/2007 | Abdo | G06F 16/2462 |
|---|---|---|---|---|
| | | | | 707/999.1 |
| RE40,063 | E * | 2/2008 | Doktor | G06F 16/288 |
| | | | | 707/999.102 |

(Continued)

FOREIGN PATENT DOCUMENTS

WO   2017140710   8/2017

OTHER PUBLICATIONS

Jules White, Elsevier, 2017, pp. 1268-1284.*
(Continued)

*Primary Examiner* — Michael I Ezewoko
(74) *Attorney, Agent, or Firm* — Robert C. Kowert; Kowert, Hood, Munyon, Rankin & Goetzel, P.C.

(57) ABSTRACT

Various embodiments of apparatuses and methods for an automated machine learning pipeline service and an automated machine learning pipeline generator are described. In some embodiments, the service receives a request from a user to generate a machine learning solution, as well as a dataset that comprises values with different user variable types, and mapping of the user variable types to pre-defined types. The generator can validate the dataset, enrich the values of the dataset using external data sources, transform values of the dataset based on the pre-defined types, train a machine learning model using the enriched and transformed values, and compose an executable package, comprising enrichment recipes, transformation recipes, and the trained machine learning model, that generates scores for other data when executed. The service can further test the executable package using testing data, and provide results of the test to the user.

20 Claims, 10 Drawing Sheets

(51) Int. Cl.
  *G06F 18/2113*  (2023.01)
  *G06N 5/025*  (2023.01)
  *G06N 5/04*  (2023.01)
  *G06N 5/046*  (2023.01)

(52) U.S. Cl.
  CPC ........... *G06F 18/217* (2023.01); *G06N 5/025* (2013.01); *G06N 5/04* (2013.01); *G06N 5/046* (2013.01)

(56) References Cited

U.S. PATENT DOCUMENTS

| | | | |
|---|---|---|---|
| 8,375,445 B2 | 2/2013 | Higashikado | |
| 8,400,458 B2* | 3/2013 | Wu | G06F 15/8023 345/506 |
| 8,463,811 B2* | 6/2013 | Lakshmanan | G06F 16/215 707/696 |
| 8,856,029 B1* | 10/2014 | Khan | H04W 4/21 705/14.58 |
| 9,288,059 B2 | 3/2016 | Nix | |
| 9,413,827 B2 | 8/2016 | Sharma et al. | |
| 9,438,440 B2 | 9/2016 | Burns et al. | |
| 9,508,347 B2 | 11/2016 | Wang et al. | |
| 9,529,837 B2* | 12/2016 | Meng | G06F 16/2255 |
| 9,552,408 B2* | 1/2017 | Malewicz | G06F 16/137 |
| 9,563,854 B2 | 2/2017 | Cruz Mota et al. | |
| 9,838,410 B2* | 12/2017 | Muddu | G06F 16/254 |
| 10,148,623 B2* | 12/2018 | Tidwell | H04L 63/0421 |
| 10,193,913 B2 | 1/2019 | Machlica et al. | |
| 10,210,246 B2* | 2/2019 | Stojanovic | G06Q 30/02 |
| 10,311,044 B2* | 6/2019 | Gebremariam | G06F 9/451 |
| 10,419,462 B2* | 9/2019 | Muddu | G06N 7/01 |
| 10,530,787 B2* | 1/2020 | Avrahami | H04L 63/1441 |
| 10,534,775 B2* | 1/2020 | Moerkotte | G06F 16/24545 |
| 10,782,880 B2* | 9/2020 | Kim | G06F 3/0631 |
| 11,303,545 B2* | 4/2022 | Kumar | G06F 16/21 |
| 11,520,834 B1* | 12/2022 | Karnagel | G06F 16/2453 |
| 11,537,594 B2* | 12/2022 | Budalakoti | G06F 16/221 |
| 11,620,547 B2* | 4/2023 | Karnagel | G06N 5/04 706/12 |
| 2003/0110252 A1 | 6/2003 | Yang-Huffman | |
| 2006/0200007 A1 | 9/2006 | Brockway et al. | |
| 2008/0306903 A1* | 12/2008 | Larson | G06F 16/2462 |
| 2009/0296594 A1* | 12/2009 | Cao | H04L 43/00 370/252 |
| 2009/0307277 A1 | 12/2009 | Grubov et al. | |
| 2010/0332149 A1 | 12/2010 | Scholpp | |
| 2011/0200239 A1 | 8/2011 | Levine et al. | |
| 2012/0005755 A1 | 1/2012 | Kitazawa et al. | |
| 2012/0143020 A1 | 6/2012 | Bordoley et al. | |
| 2012/0208161 A1 | 8/2012 | Takata et al. | |
| 2012/0289790 A1 | 11/2012 | Jain et al. | |
| 2013/0060792 A1* | 3/2013 | Weissman | G06F 16/2453 707/765 |
| 2014/0058986 A1 | 2/2014 | Boss et al. | |
| 2014/0266684 A1 | 9/2014 | Poder et al. | |
| 2014/0330884 A1* | 11/2014 | Meng | G06F 9/5072 709/201 |
| 2015/0281401 A1 | 10/2015 | Le et al. | |
| 2016/0050264 A1 | 2/2016 | Breed et al. | |
| 2016/0072891 A1 | 3/2016 | Joshi et al. | |
| 2016/0164678 A1 | 6/2016 | Nix | |
| 2016/0171371 A1 | 6/2016 | Andrejko et al. | |
| 2016/0188292 A1 | 6/2016 | Carter et al. | |
| 2016/0217387 A1 | 7/2016 | Okanohara et al. | |
| 2016/0239749 A1 | 8/2016 | Peredriy et al. | |
| 2016/0358095 A1 | 12/2016 | Dong et al. | |
| 2017/0126704 A1 | 5/2017 | Nandha Premnath et al. | |
| 2017/0372232 A1* | 12/2017 | Maughan | G06F 3/0482 |
| 2018/0030775 A1* | 2/2018 | Walsh | E06B 1/34 |
| 2018/0285767 A1 | 10/2018 | Chew | |
| 2018/0307758 A1* | 10/2018 | Reiser | G06F 9/3016 |
| 2019/0036716 A1 | 1/2019 | Kasaragod et al. | |
| 2019/0037040 A1 | 1/2019 | Kasaragod et al. | |
| 2019/0037838 A1 | 2/2019 | Klostermann et al. | |
| 2020/0379963 A1* | 12/2020 | Lopes | G06F 16/24542 |
| 2021/0035026 A1* | 2/2021 | Bansal | H04L 41/064 |

OTHER PUBLICATIONS

U.S. Appl. No. 15/608,748, filed May 30, 2017, Vineet Shashikant Chaoji et al.
U.S. Appl. No. 15/666,491, filed Aug. 1, 2017, Adolfo Bravo Ferreira.
U.S. Appl. No. 16/456,850, filed Jun. 28, 2019, Craig Lawton et al.
U.S. Appl. No. 16/807,055, filed Mar. 2, 2020, Nima Sharifi Mehr et al.
U.S. Appl. No. 16/864,959, filed May 1, 2020, Nima Sharifi Mehr.
U.S. Appl. No. 16/864,999, filed May 1, 2020, Nima Sharifi Mehr.
U.S. Appl. No. 16/865,005, filed May 1, 2020, Nima Sharifi Mehr.
AWS, "Amazon SageMaker Developer Guide", Retrieved on Jun. 24, 2020 from https://docs.aws.amazon.com/sagemaker/latest/dg/sagemaker-dg.pdf, pp. 1-1021.
AWS, "Step FunctionsDeveloper Guide", Retrieved on Jun. 24, 2020 from https://docs.aws.amazon.com/step-functions/latest/dg/step-functions-dg.pdf, pp. 1-317.
AWS, "Lambda Developer Guide", Retrieved on Jun. 24, 2020 from https://docs.aws.amazon.com/lambda/latest/dg/lambda-dg.pdf, pp. 1-744.
"Docker overview _ Docker Documentation", Retrieved on Jun. 24, 2020 from https://docs.docker.com/get-started/overview/, pp. 1-7.
F. Pedregosa, et al., "Scikit-learn: Machine learning in Python", Journal of Machine Learning Research, 12, 2011, pp. 2825-2830.
Lars Buitinck, et al., "API design for machine learning software: experiences from the scikit-learn project", In ECML JKDD Workshop: Languages for Data Mining and Machine Learning, arXiv:1309.0238v1, Sep. 1, 2013, pp. 1-15.

* cited by examiner

US 11,989,627 B1

AUTOMATED MACHINE LEARNING PIPELINE GENERATION

BACKGROUND

Registering new accounts using stolen or synthetic credentials for malicious activities is among the most prevailing types of fraud in a variety of online industries, ranging from online retailers and marketplaces to financial services and social networks. Failing to protect this point of entry can make it harder to detect fraud later, resulting in massive financial losses and potentially irreversible damages to client or user trust and company reputation.

New Account Fraud ("NAF") or Registration Fraud is generally defined as fraud that occurs within the first 90 days after an account is open; the accounts that are often opened solely to commit fraud. The fraudsters register for new accounts with either no intention of making a payment, by using prepaid cards with no funds available or paying through the stolen credit cards. A different modus operandi ("MO") is to pay and immediately request chargeback from card's issuing bank after receiving the purchased goods or services. Another large chunk of registration fraud is done using stolen personally identifiable information ("PII") like SSN, name, phone and billing address. Cyber criminals steal the highly-sensitive PII and create fake online accounts with the sole intent to abuse the services. Moreover, the rise of large scale data breaches is fueling increase in such activities. In 2019, Identity Theft Resource Center reported 17% annual increase in the number of U.S. data breaches.

Building a machine learning ("ML") fraud prevention solution requires significant domain expertise, an engineering team to automate and integrate it into business workflow, and a number of investigators to keep a human eye on suspicious activities. This demands massive investment and hence, many online companies have relied on external fraud management solutions in the past. In addition, available fraud management solutions require a heavy-touch and expensive onboarding process that still result in fragile systems that are hard to customize. This often results in businesses needing to settle for unsatisfactory performance or to hire their own ML experts.

Figure 1:
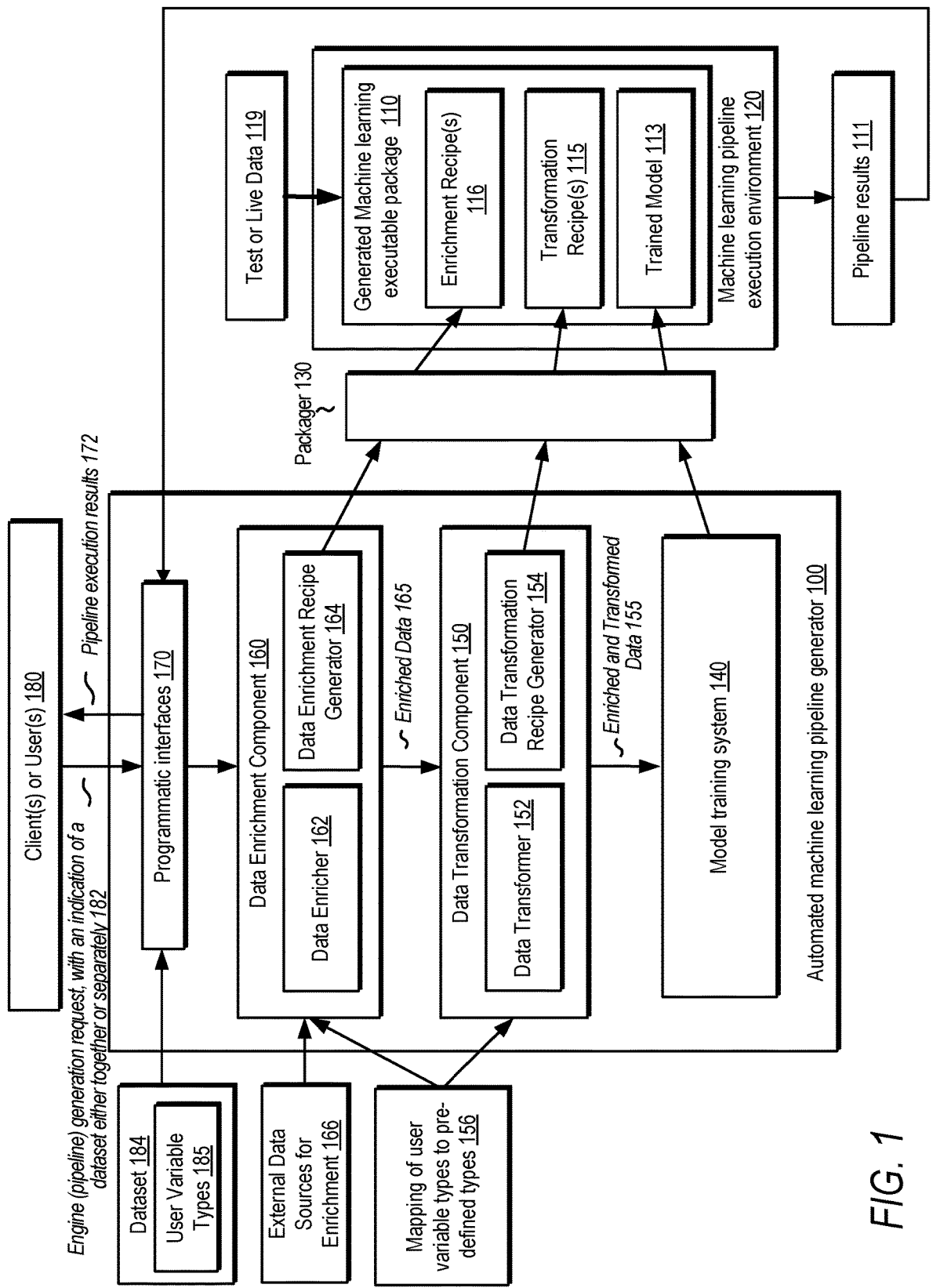
FIG. 1 illustrates an example system environment for the automated machine learning pipeline generator that comprises programmatic interfaces to interface with clients, a data enrichment component, a data transformation component, and a model training system, where the generator receives a dataset, external enrichment data, and a mapping, and interfaces with a packager to generate a generated machine learning executable package that can execute in a machine learning pipeline execution environment to produce results from either test or live data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In addition, in the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context.

DETAILED DESCRIPTION OF EMBODIMENTS

The systems and methods described herein implement automated machine learning pipeline generation that can be used, in some embodiments, to generate a customized machine learning executable including a trained machine learning model that is specifically tailored to the types of data inputted to it. Automated machine learning pipeline generation described herein can be a completely automated machine-learning pipeline that validates, enriches and transforms raw variables into model features and then trains an optimized machine learning model in a single process, in some embodiments. An automated machine learning pipeline generation system or method can, in some embodiments, provide a scalable system that is custom tailored to the specific problem presented to it by a user, without the infrastructure set-up costs and inflexibility that comes with traditional systems. Automated machine learning pipeline generation enables users, with little to no machine learning ("ML") expertise, to build ML solutions with just a few clicks, in some embodiments. Automated machine learning pipeline generation can be used to build various types of machine learning models, in some embodiments. Automated machine learning pipeline generation can build different machine learning model types where machine learning models are customized based on the client or user's data, use-case and/or domain, in some of these embodiments. The end result of the automated machine learning pipeline generation can be a customized ML executable pipeline that includes a tailored and trained ML model for the user, in some of these embodiments.

An automated machine learning pipeline generator described herein can, in some embodiments, build robust classification models that are customized based on the client or user's data, use-case and/or domain, among other criteria. An automated machine learning pipeline generator, in some embodiments, provides multiple innovations over traditional systems to accomplish this innovative result. For example, some embodiments of an automated machine learning pipeline generator can implement variable types which allows it to understand a user's data. In addition, some embodiments of an automated machine learning pipeline generator can implement adaptive workflows that dynamically adjust data validations and transformations. In addition, some embodiments of an automated machine learning pipeline generator can supplement client or user data with risk signals based on a provider network's fraud history in a secure and privacy preserving manner. The automated machine learning pipeline generator can be effective in building models for a variety of users with performance that are better or comparable to machine-learning models built manually, in some embodiments. The automated machine learning pipeline generator can regularly produce a trained model on a variety of real datasets which have an area under the receiver operating characteristic curve ("AUC") of greater than 0.9, in some embodiments.

An automated machine learning pipeline generation system can provide these and other features by, in some embodiments, providing an interface for a plurality of clients to request automated generation of machine learning engines based on datasets, and the receiving a request from a client via the interface to generate a machine learning engine. The automated machine learning pipeline generation system can also receive other information via the interface, wherein the information comprises an indication of a dataset, wherein the dataset comprises a plurality of data points and a plurality of user variable types, wherein individual data points comprise one or more values for a respective one or more of the user variable types such that the dataset collectively comprises a plurality of values for individual ones of the plurality of user variable types, and wherein the information further comprises an indication of a mapping of the individual ones of the user variable types to pre-defined types. Responsive to the receipt of the request to generate the machine learning engine via the interface, the automated machine learning pipeline generation system might enrich at least some of the one or more values of at least some of the individual data points of the dataset using one or more data sources external to the dataset, to produce an enriched version of the dataset, and to produce enrichment recipes defining the process of the enrichment for the values of the individual user variable types, in some embodiments. An automated machine learning pipeline generation system might transform at least some of the one or more values of at least some of the individual data points of the dataset based at least in part on the pre-defined types of the respective individual ones of the user variable types, to produce a transformed version of the enriched dataset, and to produce transformation recipes defining the process of the transformation for the values of the individual user variable types, in some embodiments. An automated machine learning pipeline generation system might train a machine learning model using at least some of the data points of the enriched and transformed dataset, in some embodiments. An automated machine learning pipeline generation system might compose an executable package comprising an enrichment component based at least in part on the enrichment recipes, a transformation component based at least in part on the transformation recipes, and the trained machine learning model, wherein the executable package is configured to generate scores for at least other data points external to the dataset.

Fraud Detection

In the fraud detection space, the automated machine learning pipeline generation system can be implemented as part of a larger fraud detection system to empower users that lack expertise in machine learning to create intelligent fraud prevention systems, in some examples. For example, the automated machine learning pipeline generation system can be used for fighting new account fraud. As another example, the automated machine learning pipeline generation system can be used for new account takeover ("ATO"). ATO is a fast-growing form of online fraud. It's an attractive option for fraudsters due to an existing "trust" relation between an account and a service provider. The lack of ATO labels and extreme class imbalance are the main challenges. The automated machine learning pipeline generation system can be used as a managed solution for ATO by using the building blocks described below for an automated ML pipeline, in some embodiments.

The automated machine learning pipeline generation system can be a completely automated machine-learning pipeline that validates, enriches and transforms raw variables into model features and then trains an optimized ML model in a single process, in some embodiments. The resulting trained pipeline can be immediately hosted online for real-time scoring of new events, in some of these embodiments.

An automated machine learning pipeline generation system for fraud prevention provides users, in some embodiments, with a scalable fraud management system that detects fraudulent online activity at the time of registration in a fraction of a second, without the infrastructure set-up costs and inflexibility that comes with traditional systems. At the time of registration on a website or a mobile application a new user might provide a username, often in the form of an email address. Additionally, an online merchant or service provider might collect a number of data elements about the new user, including an IP address, a user agent, a credit card number, a phone number, and/or a billing address, etc. Each of these features can carry specific behavioral and historic patterns that are different for fraudsters as compared to the legitimate users. For example, an email address that looks like "jkxbcf+0001@random-domain.com" has more of a chance of being fraudulent than "john.grisham@gmail.com", simply because fraudsters often use bots to randomly generate email aliases and automatically register them. Similarly, IP addresses originating from a certain internet service provider ("ISP") or region can provide valuable information about riskiness of an online activity. An automated machine learning pipeline generation system for fraud prevention leverages these patterns using machine learning.

Unfortunately these behavioral and historic patterns, as well as amount of collected data at the time of registration can vary for different merchants. Different businesses' verticals experience different fraud attacks, but there are also some commonalities like the format of bad email addresses. The goal of the automated machine learning pipeline generation system for fraud prevention is to learn patterns that are specific to a given client or user. The automated machine learning pipeline generation system for fraud prevention provides an automatic workflow for building ML models for fraud detection, in some embodiments. It accepts client or user specific registration or guest checkout data in its raw form, and creates a fraud model specifically for that client or user, in some embodiments. In the backend, the automated machine learning pipeline generation system for fraud prevention can dynamically perform smart data validations, data enrichment, feature engineering, hyper parameter tuning for building a classification model, and reporting of the model's metrics to its clients or users.

Overview of Automated Machine Learning Pipeline Generation for Fraud Prevention

The following sections discuss a preferred embodiment of an automated machine learning pipeline generation system that is tailored to the fraud prevention or detection space. However, many of the concepts discussed below are generic concepts that can be applied to other types of spaces and problems, and are not limited solely to the fraud prevention/detection space. Therefore, while the concepts discussed below might be discussed in the context of the fraud prevention embodiment, they can also be applied to other embodiments where the automated machine learning pipeline generation system is used in other spaces, and to solve other types of problems. Therefore, the discussion below should not be construed as limiting the automated machine learning pipeline generation system to fraud prevention or detection.

The Automated Machine Learning Pipeline Generation system and method for fraud prevention is, in some embodiments, an automated ML pipeline for new account fraud detection that dynamically adapts to a user's input data. The ML pipeline can incorporate fraud prevention into an ML service tailored for users who are interested in building and deploying their own fraud detection models from scratch, in some embodiments. In the fraud prevention area, generic solutions do not seem to work well for machine learning models. Therefore, Automated Machine Learning Pipeline Generation for fraud prevention limits the scope of the problem, and can make assumptions that enable high performance, in some embodiments. For example, semantically understanding that a data element is an IP Address allows the Automated Machine Learning Pipeline Generation to enrich the data element with meta-data and embeddings, in some embodiments. These meta-data and embeddings can be pre-trained on data from a provider network, in some embodiments. Additionally, Automated Machine Learning Pipeline Generation can employ split strategies of an initial dataset, where the split strategies take into account common time-based pitfalls that result from, for example, label maturity issues and interactions with a human adversary, in some embodiments. In the fraud prevention area, many of the data problems are shared, and therefore the Automated Machine Learning Pipeline Generation can further optimize its pipeline for this special case to deliver better results for users.

One goal of the Automated Machine Learning Pipeline Generator ("AMLPG") for fraud prevention is to build automated machine-learning solutions that help alleviate the pains many users face during the development and deployment of fraud prevention models from scratch, because of a lack of machine learning expertise and network and resource infrastructure. Indeed, even large enterprises and Fortune 500 companies currently operate their fraud prevention operations based just on negative tables and a simple rules engine. The key pain points include: 1) a need to maintain enrichment databases for features such as IP addresses and bank identification numbers ("BIN"); 2) labor intensive and error prone data transformations from a diverse set of the features such as emails and free texts; 3) cumbersome hyper-parameter tuning, and 4) lack of infrastructure support for the deployment of the entire ML pipelines including enrichment, transformation and ML models for real-time inference.

To directly address these and other needs, the AMLPG for fraud prevention, in some embodiments, is automated ML pipeline comprising of a series of steps that are performed on historical fraud data provided by the user. In some embodiments, the AMLPG for fraud prevention has individual components, each with certain responsibilities. The components of the automated machine learning pipeline generation system allow it to adapt its pipeline to different types of registration fraud data. This provides effectiveness of the generated pipeline for users in very different industries, ranging from financial services to travel.

To initiate the model training, in some embodiments, users only need to prepare their dataset in a form of CSV file and map the columns to a pre-defined set of variable types. Variable types is an important concept in AMLPG and it allows the system to understand what data a user has, in some embodiments. For example, AMLPG for fraud prevention can use, in some embodiments, 40 different variable types such as IP_ADDRESS, BIN NUMBER, SHIPPING ADDRESS, etc. If users have a variable which is not directly supported by AMLPG, they can include it in the training through assignment of one of the three generic types: NUMERIC, CATEGORICAL or FREE FORM TEXT, in some embodiments. Variable type dictates what data validations, enrichments and data transformations will be applied to a column, in some embodiments.

In some embodiments, AMLPG for fraud prevention might only require a limited number of input variables for operation. In one embodiment, AMLPG for fraud prevention might only require four variables: event timestamp, IP address, email address, and label for each event. Users might be free, however, to upload any other variables and map them appropriately, depending on the embodiment. With variable type schema properly defined, users can start the automated machine learning pipeline generation system to train a ML model, with the pipeline processing each variable based on their designated types, in some embodiments.

AMLPG's automated ML pipeline can consists of seven major steps, in some embodiments: 1) validate raw data, 2) split data, 3) enrich with 3rd party data and provider network risk signals, 4) transform data, 5) train and optimize a machine learning model, 6) package model into container, and 7) generate performance metrics. It is important to note that all steps in the pipeline might be entirely hidden from users, in some embodiments, such that the users have no visibility into what features are created, nor which features are used by the model.

As noted above, the automated machine learning pipeline generation system for fraud prevention can introduce fraud signals from a provider network as part of the pipeline. A provider network, such as a large provider network, can extract historic patterns of fraud from the provider network's data in the form of risk scores for various attributes, in some embodiments. The provider network might be a large e-commerce company that has been fighting malicious actors for decades. The provider network can automatically leverage this extensive data, such that user data is enriched with the provider network's signals which can be appended to a user's dataset, in some embodiments.

Some embodiments of the AMLPG have separation of responsibilities of each component of the workflow. In some of these embodiments, results of each step only depend on input data and configuration. In order to implement this in practice, some embodiments of AMLPG can package software into standardized units called containers that have everything the software needs to run including libraries, system tools, code, and runtime. Some embodiments of AMLPG might coordinate multiple provider network services into server-less workflows, such that services of the provider network are stitched together into feature-rich applications. Some embodiments of AMLPG might use a machine learning execution platform that provides the components used for machine learning in a single toolset.

Automated Machine Learning Pipeline Generation System: Raw Data Validation

Users' data can vary drastically from one business to another. To ensure that any data input to AMLPG is a) of good quality, b) has sufficient number of samples and c) contains a data schema is properly configured, AMLPG can, in a first step, validate a user's data before initiating the automated ML pipeline, in some embodiments. An effective validation scheme can be a pre-requisite for the AMLPG, in some embodiments.

One of the objectives of raw data validation, in some embodiments, is to identify potential issues in data or configuration errors as early as possible so that actions can be taken before wasting time in training a model that would not perform well. For example, some common errors might be mapping the wrong column to the wrong label or specifying the wrong variable types.

To this end AMLPG employs, in some embodiments, a set of heuristic requirements to be fulfilled in raw data before the data can successfully train a good model. The requirements might include 1) minimum requirement on total, fraud, and non-fraud events, 2) undefined/missing label values, 3) instability of fraud rate over time, 4) email and IP addresses adhering the expected regular expressions, 5) percentage of missing values, and 6) uniqueness of the categorical features. AMLPG can provide, in some embodiments, concise messages to help users understand potential issues in their data within a short delay. In some embodiments, this delay might be under 5 minutes. It might take on average 1 to 6 trials before successfully validating the data, in some embodiments.

Automated Machine Learning Pipeline Generation System: Data Splitting

After the data passes all validation tests, the AMLPG can split the data, in some embodiments. AMLPG might split the data into 3 segments, in some of these embodiments. For example, these 3 segments can be a training set, a validation set and a testing set. The split can be based on the event timestamp of the data, in some of these embodiments. A training set can be used to train the supervised algorithm, in some embodiments. A validation set can be used for hyper-parameter optimization, in some embodiments. The test set, might be thought of as holdout data, and might be used for estimation of model performance, in some embodiments. This estimation of model performance might estimate the model's performance on other, future unseen data. This estimation of model performance can be provided back to the user, in some embodiments.

One rationale behind this out-of-time ("OOT") splitting strategy based on event timestamps, which occurs in some embodiments, is to ensure that the model performance estimates are as realistic and unbiased as possible, with respect to the performance of the model after model deployment. It can be quite common that fraud patterns change quickly over time as fraudsters are constantly adapting their strategies. For example, both fraud rates and data distributions can vary over time. In other words, the OOT splitting strategy based on event timestamps might ensure that any performance estimates take into account the fact that relationships that existed in past may not exist in future, so that the deployed model does not perform worse than any estimates. In some embodiments, AMLPG maintains fixed split ratios of 70:15:15 for the train/validation/test segments respectively.

Automated Machine Learning Pipeline Generation System: Third Party Enrichment

In the fraud prevention and detection space, there might be a large number of categorical features and very few numeric variables, in some embodiments. Some categorical data elements are very useful for identifying fraud patterns, but have very high cardinality, in some of these embodiments. A BIN number, such as the first 6 digits of a payment card number, can reveal details about the card's type and its origin, in some embodiments. However, the number of unique BIN values can usually be measured in tens of thousands. Similarly, an IP address for a given event can point towards a location of the actor, but the cardinality of this feature can be of the order of 109. Simply injecting those variables into models will probably not work, and instead likely can result in overfitting.

As a solution to these and other problems, AMLPG can integrate 3rd party tables into its pipeline, in some embodiments. AMLPG can enrich at least one of the data elements with a high cardinality with one or more additional data elements comprising a lower cardinality or with data elements comprising numerical or continuous variables, from an external data source, in some embodiments. This can allow the system, for example, to look up a specific IP address or BIN number and retrieve multiple additional attributes. IP address enrichment, for example, can result in over 20 additional features describing the geolocation of the IP address, such as for example, autonomous system number ("ASN"), country, latitude, longitude, and/or ISP, etc. In the case of a BIN number, enrichment can identify the issuing bank name, country card level and/or brand. In some embodiments, this is one of the key steps, since, for example, automated ML solutions without these enrichments might not work properly with fraud datasets. In some embodiments, AMLPG might only enrich IP and BIN numbers, based on a data schema provided by a user. In other embodiments, AMLPG can enrich other variables that are known to be important for fraud prevention, such as, for example, phone numbers and addresses.

Automated Machine Learning Pipeline Generation System: Provider Network Enrichment To enable users build more powerful fraud detection models, the AMLPG can provide fraud patterns present in a provider network's data to the user, in the form of embeddings, in some embodiments. This can be a distinctive feature of these embodiments of AMLPG, since traditional systems can depend on a consortium model where each user is forced to share data with other members of a network. AMLPG can, in some embodiments, add additional data points from the provider network to the dataset, where any additional data points can be derived from interactions, such as by clients or 3rd parties, with one or more of the other services provided by the provider network. AMLPG can then train the machine learning model using the additional data points in addition to the data points of the received dataset, where the data points of the received dataset might have been transformed and/or enriched before the additional data points were added. In other embodiments, AMLPG can extract signals from a rich history of fraud events that the provider network has experienced, and can make them available to the users. AMLPG can, in some embodiments, build a separate machine-learning model on top of the provider network data, synthesizing the provider network data in the form of a model. AMLPG might provide signals from the separate ML model into the received dataset (where the received dataset might have been received from the client).

Either before or after performing feature engineering on a user's data, AMLPG can add representations (a.k.a embeddings) learned on the provider network's data as additional features. For example, AMLPG can provide representations of email and IP addresses as additional features, in some embodiments. AMLPG can also extend these representations to include the provider network's representations of useragent, device fingerprint and/or address fields, in some embodiments. These embeddings can be first pre-trained using a neural network on fraud data from the provider network, in some embodiments. The email embeddings, for example, can be trained using a Long Short-Term Memory recurrent neural network ("LSTM") on character sequences to predict the fraud labels, in some embodiments. Similarly, IP address embeddings can be trained, for example, on the IP enriched fields (e.g., ASN, country, timezone, postal code, ISP) using a feed forward network to predict fraud labels, in some embodiments.

With embeddings from models trained on provider network data, AMLPG can improve, on average, the fraud capture at the 4% FPR range by 1% to 2%, in some embodiments. AMLPG can boost the true positive rate ("TPR") values at different false positive rates ("FPR") when email and ip embedding features are added to a user's data. In some embodiments, there is a consistent lift of TPR deltas by adding embedding features for 30 bootstrapped test samples until 49% FPR, after which delta starts converging to 0.

Since AMLPG uses signals extracted from a provider network's data to augment users' model training data, a natural concern is that highly sophisticated bad actors or advanced users (like security researchers or academics) can use AMLPG to extract useful information about the provider network's fraud prevention systems that could weaken the provider network's fraud detection systems. However, the provider network can implement privacy preserving randomization to protect its data, in some embodiments.

Automated Machine Learning Pipeline Generation System: Data Cleaning and Feature Engineering or Data Transformation Data cleaning and feature engineering can be critical steps in a process of automated machine learning pipeline generation. Failure to properly handle data can result in underperforming models or even complete training failure, in some embodiments. AMLPG, in some embodiments, allows clients or users to upload fully customized datasets. In some embodiments, AMLPG might only require a limited number of known variables for operation. In some embodiments, AMLPG might only require four known variables: event timestamp, IP address, email address, and label for each event. In these embodiments, beyond this limited number of required variables, AMLPG does not have any further input of the user's system or problem the user is trying to solve. Without further innovations, this might lead to issues of performing transformations without prior knowledge of what features might be available. Another issue can be how to reproduce the same or similar data transformation logic during training and during inference.

AMLPG solves these and other problems, in some embodiments, by using concept of variable types. In some embodiments, clients or users can define variable types for each column in their CSV file before initiating model training. For individual variable types, in some embodiments, AMLPG can define a set of data cleaning and transformations steps (transformers) in a global configuration file. At runtime, during the transformation step, AMLPG can check which variable types are present in the data, and the workflow can dynamically generate a customized transformation recipe, in some of these embodiments. For example, if dataset contains an "email_address" column and a client or user indicates it is of type EMAIL, then based on global configuration file AMLPG might know that it needs to first replace missing values with handle@domain.com, and then split that column into two columns, handle and domain, based on a pre-defined regular expression.

In addition, aggregated features from the history of user's data (such as the number of fraudulent events using the same IP) might also further improve a model's performance and capture more fraud. Therefore, in some embodiments, the feature engineering functionality of this pipeline can be extended by incorporating a data aggregation component that aggregates these and other features from the history of user's data.

In a next step, AMLPG can use a custom recipe to build a custom Transformer object, in some embodiments. A custom Transformer object can be a conglomerate of many transformers, such that the object is able to handle the custom dataset of the user, in some embodiments. The Transformer object might be fitted on training data, in some embodiments, since some transformers need to learn their parameters. For example, missing values in numeric columns might need to be replaced with a mean value, and the Transformer object might learn that mean during some type of training. A fitted Transformer object can be saved as an artifact by AMLPG, in some embodiments, and can be used during inference to apply correct transformations to client or user data.

The Transformer object of AMLPG might not depend on prior knowledge of a data schema, in some embodiments. AMLPG can use a dynamic approach to data transformation that allows it to encapsulate transformation code into standardized units called containers, while controlling transformation logic in configuration files, in some embodiments. In some embodiments, adding support for a new variable type, or modifying processing steps, can simply be accomplished in AMLPG by a configuration file change, with no code deployment. In some embodiments, AMLPG might have a large number of specific transformers. In some embodiments, depending on number and types of variables, AMLPG might perform between tens and hundreds of transformations at inference time. However, since at inference, some embodiments of AMLPG only deal with single row inputs, AMLPG can remove any redundant validations and checks that might be needed in large datasets, thus reducing inference time.

Automated Machine Learning Pipeline Generation System: Model Training

Many common implementations of ML algorithms, such as random forest, XGBoost, and neural networks, do not handle categorical features directly and require pre-processing of categorical features into numerical values (e.g., one-hot-encoding, embedding, and target encoding). However, the vast majority of data for online fraud prevention, for example, can be categorical variables such as enrichment features from IP addresses (e.g., IP city), and bank identification numbers (e.g., bank names), as well as information related to billing or shipping (e.g., names and postal code). It is not uncommon that many of the categorical variables have a cardinality in the order of thousands or even tens of thousands. In some embodiments, AMLPG can gracefully deal with categorical features without cumbersome preprocessing. AMLPG can directly handle categorical features by using an ordered target statistic to minimize the impact of target leakage. In some embodiments, AMLPG can consistently outperform other options by up to 2 base points in term of area under the receiver operating characteristic curve ("AUC"), often with minimal hyperparameter tuning. In addition, the inference speed can be an order of magnitude faster than both random forest and XGBoost, in some embodiments.

In some embodiments of AMLPG, hyper-parameter optimization ("HPO") can be used during model training to minimize the chance that default hyper-parameters may not be optimal for a specific data set. AMLPG can use the AUC metric on a separate out-of-time validation data set as the optimization metric to tune the hyper-parameters, in some of these embodiments. This validation data set can be created by the splitting component of AMLPG previous to the model, in some embodiments. Other metrics can also be used besides AUC, depending on the specific use cases. In addition, simple grid or random search can be very effective when the problem has narrow search space and small data set, in some embodiments. However, finding the optimal solution in a high-dimensional space with both categorical and continuous hyper-parameters and hierarchical dependencies via simple grid or random search is not always the fastest or even feasible with limited budget, especially for large data sets, in other embodiments. Instead of grid or random search, in which samples are taken independently regardless of the search histories, some embodiments of AMLPG can decide more intelligently which set of configurations to try next based on past samples (e.g., avoiding the expensive evaluation of unpromising configurations). AMLPG can employ sequential model-based optimization ("SMBO") as a Bayesian optimization framework for hyper-parameter optimization in ML, in some embodiments. SMBO can significantly improve the quality of the returned configurations, often in less time or trials, in some embodiments.

Automated Machine Learning Pipeline Generation System: Model Packaging

After training, in some embodiments, the containers (enrichment, transformation, provider network embedding model, and classification model) can be chained together into a pipeline that is ready to be hosted in machine learning execution environment for real-time inference. The pipeline can takes in the raw variables and produce risk scores using all the artifacts generated during training, in some embodiments.

Automated Machine Learning Pipeline Generation System: Model Performance Validation The purpose of model performance validation, in some embodiments, is to use a separate out-of-time test data set to estimate the overall performance of the trained pipeline (including enrichment, transformation, and classification) on future data. This test data set can be created by the splitting component of AMLPG previous to the model performance validation, in some embodiments. The performance metrics of the model can be reported back to the users in terms of AUC and ROC curves, in some embodiments. Based on the reported performance metrics, a user can determine if the model's performance meets their business needs. If the user chooses to go forward with the model, the user might also choose an appropriate threshold on predicted risk scores to trigger actions (e.g., decline, investigate, and pass), in some embodiments. By using a use a separate out-of-time test data, AMLPG can produce unbiased estimates of model performance that minimize the proximities of being either overly optimistic or overly pessimistic, in some embodiments.

Embodiments of an Automated Machine Learning Pipeline Generation Service

FIG. 1 illustrates an example system environment for the automated machine learning pipeline generator 100 that comprises programmatic interfaces 170 to interface with clients 180, a data enrichment component 160, a data transformation component 150, and a model training system 140, where the generator receives a dataset 184, external enrichment data 166, and a mapping 156, and interfaces with a packager 130 to generate a generated machine learning executable package 110 that can execute in a machine learning pipeline execution environment 120 to produce results 111 from either test or live data 119, according to some embodiments.

In some embodiments, an automated machine learning pipeline generator 100, as well as any number of other possible services, operates as part of a service provider network (not shown in FIG. 1). However, the automated machine learning pipeline generator 100 does not necessarily need to operate within a provider network, and can operate in a non-provider network client-server situation, or as simply software or an application running on one or more computers of a user or client, or in various other configurations that do not include provider networks, in some embodiments. In the embodiments that include a provider network, the services of the provider network can comprise one or more software modules executed by one or more electronic devices at one or more data centers and geographic locations, in some embodiments. Client(s) 180 and/or edge device owner(s) using one or more electronic device(s) (which may be part of or separate from the service provider network) can interact with the various services of the service provider network via one or more intermediate networks, such as the internet. In other examples, external clients or internal clients can interact with the various services programmatically and without human involvement.

A provider network provides clients 180 with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The clients (or "customers") of provider networks may utilize one or more user accounts that are associated with a client account, though these terms may be used somewhat interchangeably depending upon the context of use. Clients and/or edge device owners may interact with a provider network across one or more intermediate networks (for example, the internet) via one or more interface(s), such as through use of application programming interface (API) calls, via a console implemented as a website or application, etc. The interface(s) may be part of, or serve as a front-end to, a control plane of the provider network that includes "backend" services supporting and enabling the services that may be more directly offered to clients.

To provide these and other computing resource services, provider networks often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code—typically without the client having any control of or knowledge of the underlying compute instance(s) involved.

As indicated above, service provider networks have enabled developers and other users to more easily deploy, manage, and use a wide variety of computing resources, including databases. The use of a database service, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, and so forth.

In FIG. 1, the client(s) or user(s) 180 send an engine or pipeline generation request, with an indication of a dataset either together or separately from the generation request 182, in some embodiments. The request is sent to programmatic interfaces 170 of the automated machine learning pipeline generator 100, in some of these embodiments. The automated machine learning pipeline generator 100, either through the programmatic interfaces 170, or through another mechanism, obtains a dataset 184 that pertains to the user or client 180. The automated machine learning pipeline generator 100 can obtain the dataset by receiving it directly from the user or client 180, or by receiving an indication of its location in a storage device, and downloading it, either in whole or in pieces to the automated machine learning pipeline generator 100, in some embodiments. The dataset 184 can comprise a plurality of data points and a plurality of user variable types 185, wherein individual data points comprise one or more values for a respective one or more of the user variable types 185 such that the dataset 184 collectively comprises a plurality of values for individual ones of the plurality of user variable types 185, in some embodiments.

The automated machine learning pipeline generator 100 also obtains a mapping of the individual ones of the user variable types 185 to pre-defined types, in some embodiments. The automated machine learning pipeline generator 100 can obtain the mapping by receiving it directly from the user or client 180, or by receiving an indication of its location in a storage device, and downloading it, either in whole or in pieces to the automated machine learning pipeline generator 100, in some embodiments. For example, to initiate the model training, in some embodiments, users or clients 180 only need to prepare their dataset 184 in a form of CSV file and map the columns (where the different columns are different user variable types 184) to a pre-defined set of variable types. In addition, at some point in the process, the automated machine learning pipeline generator 100 also obtains external data sources for enrichment 166, in some embodiments. These external data sources 166 can be third party data sources, and/or data sources of the provider network, in some embodiments.

The dataset 184 is input to the data enrichment component 160, in some embodiments. The data enrichment component can enrich at least some of the one or more values of at least some of the individual data points of the dataset using one or more data sources external to the dataset, to produce an enriched version of the dataset, and to produce enrichment recipes defining the process of the enrichment for the values of the individual user variable types, in some embodiments. The data enricher 162 can enrich the data of the dataset 184 by using the external data sources for enrichment 166, in some embodiments. The data enricher 162 might also use the mapping of user variable types to pre-defined variable types 156 when enriching the data. The data enrichment recipe generator 164 can produce enrichment recipes 116 defining the process of the enrichment for the values of the individual user variable types, in some embodiments. These enrichment recipes 116 might be sent to a packager 130 to be packaged into a generated machine learning executable package 110.

Using the data enrichment component 160, AMLPG 100 can integrate 3rd party tables into its pipeline, in some embodiments. This can allow the system, for example, to look up a specific IP address or BIN number and retrieve multiple additional attributes. IP address enrichment, for example, can result in over 20 additional features describing the geolocation of the IP address, such as for example, autonomous system number ("ASN"), country, latitude, longitude, and/or ISP, etc. In the case of a BIN number, enrichment can identify the issuing bank name, country card level and/or brand. In some embodiments, this is one of the key steps, since, for example, automated ML solutions without these enrichments might not work properly with fraud datasets. In some embodiments, AMLPG 100 might only enrich IP and BIN numbers, based on a data schema provided by a user. In other embodiments, AMLPG 100 can enrich other variables that are known to be important for fraud prevention, such as, for example, phone numbers and addresses.

The enriched dataset 164 is input to the data transformation component 150, in some embodiments. The data transformation component can transform at least some of the one or more values of at least some of the individual data points of the dataset based at least in part on the pre-defined types of the respective individual ones of the user variable types, to produce a transformed version of the enriched dataset, and to produce transformation recipes defining the process of the transformation for the values of the individual user variable types. The data transformer 152 can transform the enriched data 165 by using the mapping of user variable types to pre-defined variable types 156, in some embodiments. In some embodiments, clients or users can define variable types for each column in their CSV file before initiating model training. For individual variable types, in some embodiments, AMLPG 100 can define a set of data cleaning and transformations steps (transformers) in a global configuration file. At runtime, during the transformation step, AMLPG 100 can check which variable types are present in the data, and the workflow can dynamically generate a customized transformation recipe, in some of these embodiments. For example, if dataset contains an "email address" column and a client or user indicates it is of type EMAIL, then based on global configuration file AMLPG 100 might know that it needs to first replace missing values with handle@domain.com, and then split that column into two columns, handle and domain, based on a pre-defined regular expression.

In a next step, AMLPG 100 can use a custom recipe to build a custom Transformer object, in some embodiments. The data transformation recipe generator 154 can produce transformation recipes 115 defining the process of the transformation for the values of the individual user variable types, in some embodiments. A custom Transformer object can be a conglomerate of many transformers, such that the object is able to handle the custom dataset of the user, in some embodiments. The Transformer object might be fitted on training data, in some embodiments, since some transformers need to learn their parameters. For example, missing values in numeric columns might need to be replaced with a mean value, and the Transformer object might learn that mean during some type of training. The transformation recipes 115 might be sent to a packager 130 to be packaged into a generated machine learning executable package 110. A fitted Transformer object can be saved as an artifact by AMLPG 100, in some embodiments, and can be used during inference to apply correct transformations to user data.

The model training system 140 can train a machine learning model using at least some of the data points of the enriched and transformed dataset 155, in some embodiments. In some of these embodiments of AMLPG 100, hyper-parameter optimization ("HPO") can also be used during model training to minimize the chance that default hyper-parameters may not be optimal for a specific data set. AMLPG 100 can use the AUC metric on a separate out-of-time validation data set as the optimization metric to tune the hyper-parameters, in some of these embodiments.

In some embodiments, the containers that have been packaged by the packager 130 (such as the enrichment recipe(s) 116, transformation recipe(s) 115, any provider network embedding model, and/or a trained machine learning model 113) can be chained together into a generated machine learning executable package 110 that is ready to be hosted in machine learning execution environment 120 for real-time inference. The AMLPG 100 can compose an executable package comprising an enrichment component based at least in part on the enrichment recipes, a transformation component based at least in part on the transformation recipes, and the trained machine learning model, wherein the executable package is configured to generate scores for at least other data points external to the dataset, in some embodiments. The pipeline of the generated machine learning executable package 110 can take in the raw variables (such as test or live data 119) and produce pipeline results 111, such as risk scores, using all the artifacts generated during training, in some embodiments. The pipeline execution results 172 can be returned to the client(s) or user(s) via the programmatic interface 170, in some embodiments.

Figure 2:
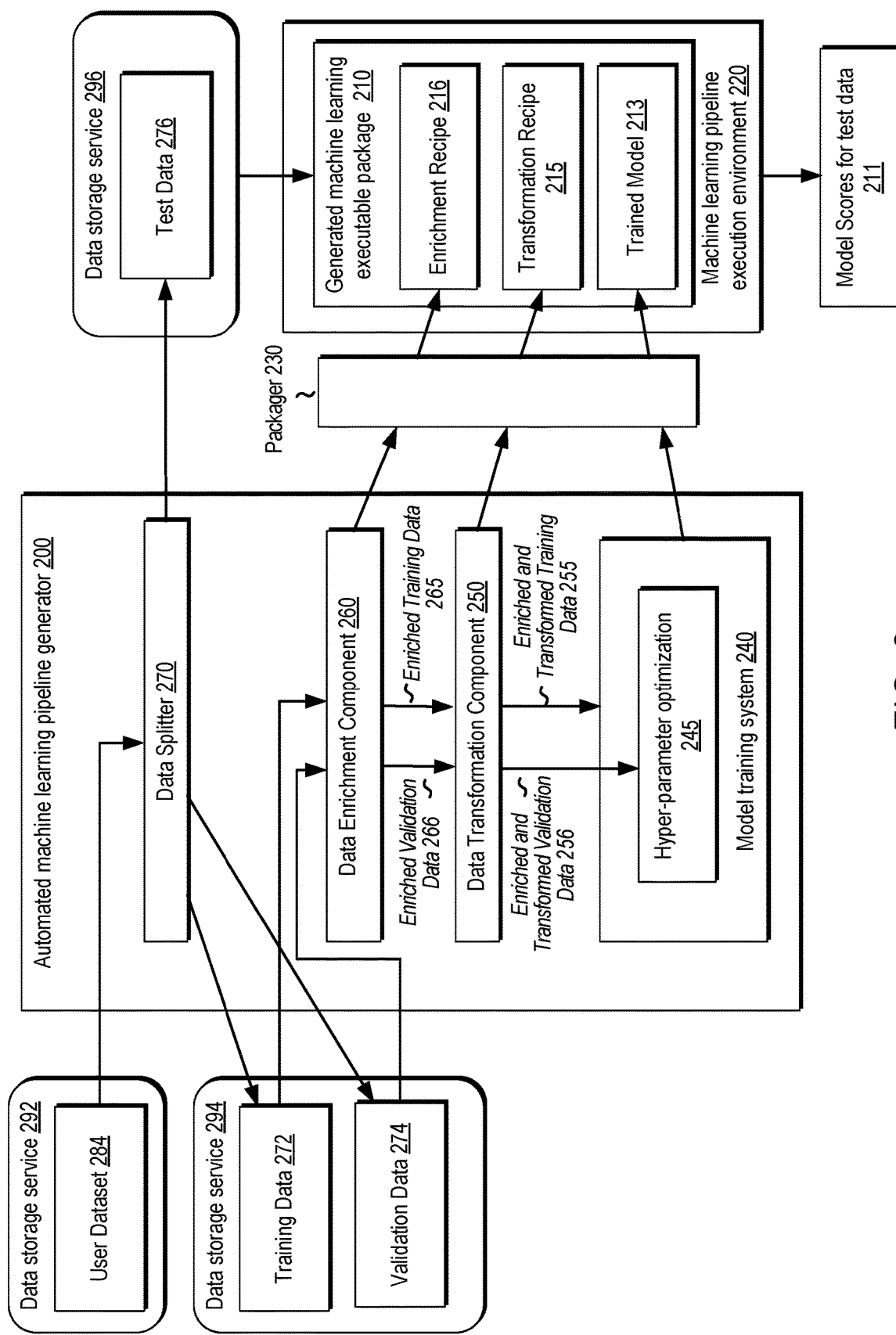
FIG. 2 illustrates further aspects of the automated machine learning pipeline generator, where the generator includes a data splitter that splits the input user dataset into training data, validation data, and test data, where the training data is used by the model training system to train the machine learning model after the training data is both enriched by the data enrichment component and transformed by the data transformation component, where the validation data is used for hyper-parameter optimization, and where the test data is used to test the generated machine learning executable package that is executed in the machine learning pipeline execution environment, to generate model scores for the test data, according to some embodiments.

FIG. 2 illustrates further aspects of the automated machine learning pipeline generator 200, where the generator 200 includes a data splitter 270 that splits the input user dataset 284 into training data 272, validation data 274, and test data 276, where the training data 272 is used by the model training system 240 to train the machine learning model after the training data 272 is both enriched by the data enrichment component 260 and transformed by the data transformation component 250, where the validation data 274 is used for hyper-parameter optimization 245, and where the test data 276 is used to test the generated machine learning executable package 210 that is executed in the machine learning pipeline execution environment 220, to generate model scores for the test data 211, according to some embodiments.

After the data of the user dataset 284 passes any validation tests, the AMLPG 200 can split the data (that might be stored in a data storage service 292) using a data splitter 270, in some embodiments. AMLPG 200 might split the data into 3 segments, in some of these embodiments. For example, these 3 segments can be a training set 272, a validation set 274 and a testing set 276. These different sets can be stored in a data storage service (294, 296) either together or separately. The split can be based on the event timestamp of the data, in some of these embodiments. A training set 272 can be enriched by the data enrichment component 260 in to enriched training data 265, can be transformed by the data transformation component 250 into enriched and transformed training data 255, and can be used to train the supervised algorithm in the model training system 240, in some embodiments. A validation set 274 can be enriched by the data enrichment component 260 in to enriched validation data 266, can be transformed by the data transformation component 250 into enriched and transformed validation data 256, and can be used for hyper-parameter optimization 245, in some embodiments. The test set 276, might be thought of as holdout data, and might be used for estimation of the generated machine learning executable package 210 performance by the machine learning pipeline execution environment 220, in some embodiments. This estimation of model performance, such as model scores for test data 211, might estimate the model's performance on other, future unseen data. This estimation of model performance can be provided back to the user, in some embodiments.

Figure 3:
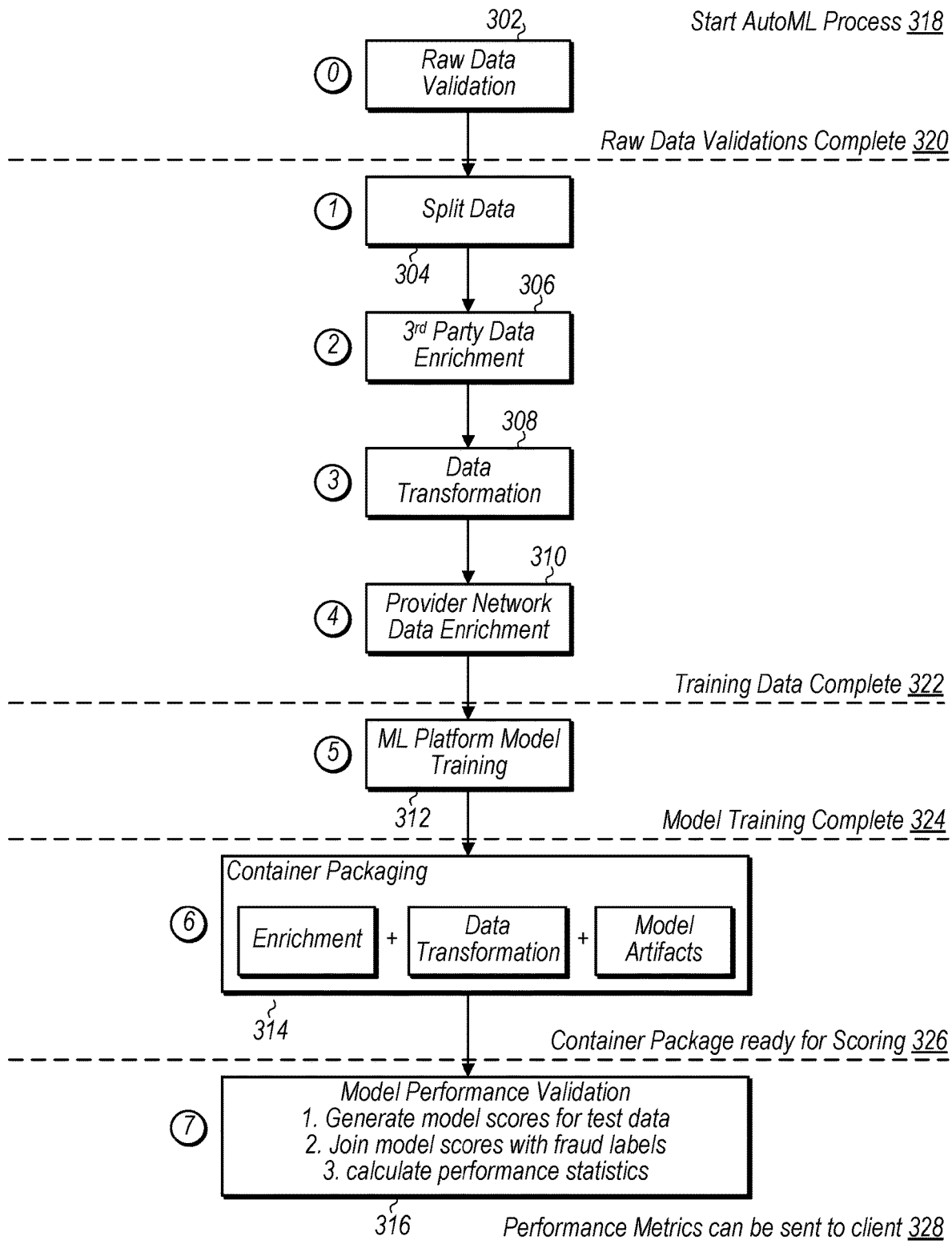
FIG. 3 illustrates an AutoML process for the automated machine learning pipeline generator, where the generator first validates the raw data, then splits the data, then enriches the data with 3rd party data, then transforms the data, then enriches the data with provider network data, then performs a machine learning model training, possibly including hyper-parameter optimization, then packages containers into a generated machine learning executable package, before validating model performance of the executable package by generating model scores for test data and calculating performance statistics, according to some embodiments.

FIG. 3 illustrates an AutoML process 300 for the automated machine learning pipeline generator, where the generator first validates the raw data 302, then splits the data 304, then enriches the data with $3^{rd}$ party data 306, then transforms the data 308, then enriches the data with provider network data 310, then performs a machine learning model training 312, possibly including hyper-parameter optimization, then packages containers into a generated machine learning executable package 314, before validating model performance 316 of the executable package by generating model scores for test data and calculating performance statistics, according to some embodiments. At the beginning the AutoML process is started 318, and after the raw data validation step 302, the raw data validations are complete 320. After the provider network data enrichment step 310, then the training data is complete 322. After the ML platform model training 312, then the model training is complete 324. After the container packaging 314, then the container package is ready for scoring 326. After the model performance validation 316, then the performance metrics can be sent to the client 328.

To ensure that any data input to AMLPG is a) of good quality, b) has sufficient number of samples and c) contains a data schema is properly configured, AMLPG can, in a first step, validate 302 a user's data before initiating the automated ML pipeline, in some embodiments. Validations, in some embodiments, can ensure that uploaded data meets the requirements to build a performance model. An effective validation scheme can be a pre-requisite for the AMLPG, in some embodiments. AMLPG employs, in some embodiments, a set of heuristic requirements to be fulfilled in raw data before the data can successfully train a good model. The requirements might include 1) minimum requirement on total, fraud, and non-fraud events, 2) undefined/missing label values, 3) instability of fraud rate over time, 4) email and IP addresses adhering the expected regular expressions, 5) percentage of missing values, and 6) uniqueness of the categorical features. AMLPG can provide, in some embodiments, concise messages to help users understand potential issues in their data within a short delay.

After the data passes all validation tests, the AMLPG can split the data 304, in some embodiments. AMLPG might split the data into 3 segments, in some of these embodiments. For example, these 3 segments can be a training set, a validation set and a testing set. The training set can comprise around 70% of the data, the validation set can comprise 15% of the data, and the training set can comprise the remaining 15%, in some embodiments. The split can be based on the event timestamp of the data, in some of these embodiments. A training set can be used to train the supervised algorithm, in some embodiments. A validation set can be used for hyper-parameter optimization, in some embodiments. The test set, might be thought of as holdout data, and might be used for estimation of model performance, in some embodiments. This estimation of model performance might estimate the model's performance on other, future unseen data. This estimation of model performance can be provided back to the user, in some embodiments.

AMLPG can integrate $3^{rd}$ party tables into its pipeline in $3^{rd}$ party data enrichment 306, in some embodiments. This can allow the system, for example, to look up a specific IP address or BIN number and retrieve multiple additional attributes. IP address enrichment, for example, can result in over 20 additional features describing the geolocation of the IP address, such as for example, autonomous system number ("ASN"), country, latitude, longitude, and/or ISP, etc. In the case of a BIN number, enrichment can identify the issuing bank name, country card level and/or brand. AMLPG can enrich at least one of the data elements with a high cardinality with one or more additional data elements comprising a lower cardinality or with data elements comprising numerical or continuous variables, from the $3^{rd}$ party tables, in some embodiments. In some embodiments, this is one of the key steps, since, for example, automated ML solutions without these enrichments might not work properly with fraud datasets. In some embodiments, AMLPG might only enrich IP and BIN numbers, based on a data schema provided by a user. In other embodiments, AMLPG can enrich other variables that are known to be important for fraud prevention, such as, for example, phone numbers and addresses.

In some embodiments, clients or users can define variable types for each column in their CSV file before initiating model training. For individual variable types, whether in columns of a CSV file or in another format, in some embodiments, AMLPG can define a set of data cleaning and transformations steps (transformers) in a global configuration file, for example. At runtime, during the transformation step 308, AMLPG can check which variable types are present in the data, and the workflow can dynamically generate a customized transformation recipe, in some of these embodiments. More generally, data transformation 308 can transform raw data in preparation for model training. For example, if dataset contains an "email_address" column and a client or user indicates it is of type EMAIL, then based on global configuration file AMLPG might know that it needs to first replace missing values with handle@domain.com, and then split that column into two columns, handle and domain, based on a pre-defined regular expression. Other examples are one hot encoding, hashing, and string manipulation. In a next step, AMLPG can use a custom recipe to build a custom Transformer object, in some embodiments. A custom Transformer object can be a conglomerate of many transformers, such that the object is able to handle the custom dataset of the user, in some embodiments. The Transformer object might be fitted on training data, in some embodiments, since some transformers need to learn their parameters. For example, missing values in numeric columns might need to be replaced with a mean value, and the Transformer object might learn that mean during some type of training. A fitted Transformer object can be saved as an artifact by AMLPG, in some embodiments, and can be used during inference to apply correct transformations to client or user data.

To enable users build more powerful fraud detection models, the AMLPG can provide fraud patterns present in a provider network's data to the user 310, in the form of embeddings, in some embodiments. Provider network's data enrichment 310 can further enrich raw data for training using provider network data. For example, the data enrichment 310 can be via feature embedding and/or frequency encoding. This can be a distinctive feature of these embodiments of AMLPG, since traditional systems can depend on a consortium model where each user is forced to share data with other members of a network. AMLPG can, in some embodiments, add additional data points from the provider network to the dataset, where any additional data points can be derived from interactions, such as by clients or 3$^{rd}$ parties, with one or more of the other services provided by the provider network. AMLPG can then train the machine learning model using the additional data points in addition to the data points of the received dataset, where the data points of the received dataset might have been transformed and/or enriched before the additional data points were added. In other embodiments, AMLPG can extract signals from a rich history of fraud events that the provider network has experienced, and can make them available to the users. AMLPG can, in some embodiments, build a separate machine-learning model on top of the provider network data, synthesizing the provider network data in the form of a model. AMLPG might provide signals from the separate ML model into the received dataset (where the received dataset might have been received from the client). Either before or after performing any data transformation on a user's data, AMLPG can add representations (a.k.a embeddings) learned on the provider network's data as additional features. For example, AMLPG can provide representations of email and IP addresses as additional features, in some embodiments. AMLPG can also extend these representations to include the provider network's representations of useragent, device fingerprint and/or address fields, in some embodiments. These embeddings can be first pre-trained using a neural network on fraud data from the provider network, in some embodiments.

The ML model training system can train a machine learning model 312 using at least some of the data points of the enriched and transformed dataset, in some embodiments. The ML platform model training can perform model training using training data. In some of these embodiments of AMLPG, hyper-parameter optimization ("HPO") can be used to determine a best performing model. For example, HPO can be run during model training to minimize the chance that default hyper-parameters may not be optimal for a specific data set. AMLPG can use the AUC metric on a separate out-of-time validation data set as the optimization metric to tune the hyper-parameters, in some of these embodiments.

After training, in some embodiments, the containers (enrichment, transformation, provider network embedding model, and classification model) can be chained together into a pipeline 314 that is ready to be hosted in machine learning execution environment for real-time inference. For example, container packaging 314 can package containers from the 3$^{rd}$ party data enrichment step 306, the data transformation step 308, the provider network data enrichment step 310, and model artifacts from the ML platform model training step 312, so that all steps can be performed together during inference. The pipeline can takes in the raw variables and produce risk scores using all the artifacts generated during training, in some embodiments.

The ML pipeline can be validated 316, in some embodiments. The purpose of model performance validation 316, in some embodiments, is to use a separate out-of-time test data set to estimate the overall performance of the trained pipeline (including enrichment, transformation, and classification) on future data. This test data set can be created by the splitting component of AMLPG previous to the model performance validation, in some embodiments. The performance metrics of the model can be reported back to the users in terms of AUC and ROC curves, in some embodiments. For example, the model performance validation step 316 can produce model performance metrics like confusion matrices, fake positives, true positives, and/or precision. Based on the reported performance metrics, a user can determine if the model's performance meets their business needs. If the user chooses to go forward with the model, the user might also choose an appropriate threshold on predicted risk scores to trigger actions (e.g., decline, investigate, and pass), in some embodiments.

Figure 4:
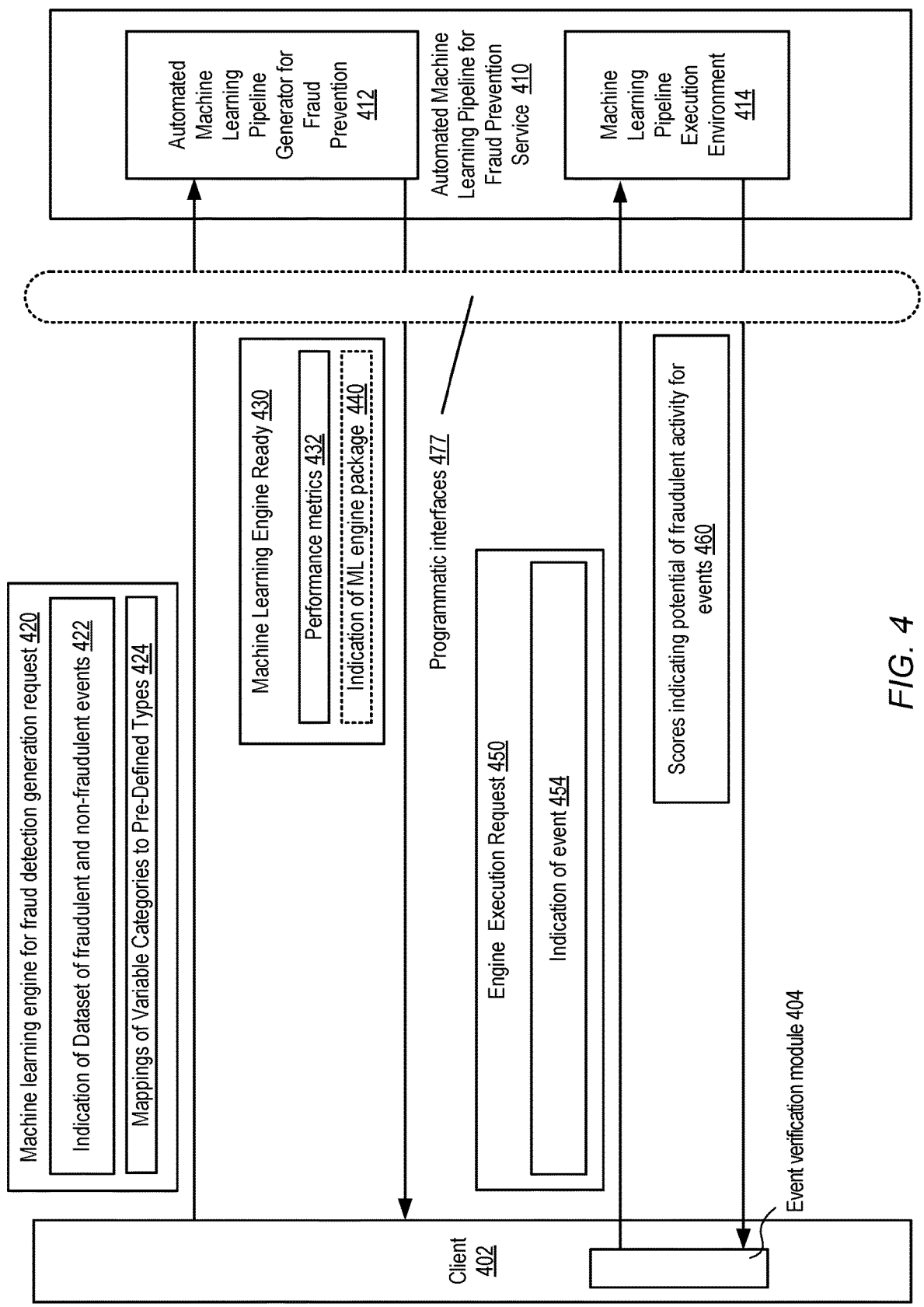
FIG. 4 illustrates example programmatic interactions between clients and an automated machine learning for fraud prevention service, where the client interacts with an automated machine learning pipeline generator to generate a machine learning executable package for fraud prevention, and then the client interacts with a machine learning pipeline execution environment to execute the generated machine learning executable package, according to some embodiments.

FIG. 4 illustrates example programmatic interactions between a client or user 402 and an automated machine learning for fraud prevention service 410, where the client or user 402 interacts with an automated machine learning pipeline generator 412 (possibly via a programmatic interface 477) to generate a machine learning executable package for fraud prevention, and then the client or user 402 interacts with a machine learning pipeline execution environment 414 to execute the generated machine learning executable package, according to some embodiments.

The client or user 402 can send a request 420 to the automated machine learning pipeline generator 412 to generate a machine learning engine (or a machine learning solution). The request might be for an ML solution or engine for fraud prevention, in some embodiments, although it can also be for other areas or problem sets as well. The client or user 402 can also send an indication of a dataset 422, such as a dataset of fraudulent and/or non-fraudulent events, or a dataset of fraudulent and/or non-fraudulent transactions and/or account registrations 422. This indication can either be included or separate from the request. The client or user 402 can also send mappings of variable categories to pre-defined types 424, either included with or separate from the request 420.

After receiving the request the automated machine learning pipeline generator for fraud prevention 412 performs one or more of the steps of FIG. 3, in some embodiments. It then sends a communication back to the client or user 402 that the machine learning engine or solution is ready 430. Either separate from or included with the machine learning engine ready communication 430, the automated machine learning pipeline generator for fraud prevention 412 an send performance metrics 432 (or an indication of performance metrics 432) to the client or user 402. The automated machine learning pipeline generator for fraud prevention 412 might also send (either together or separately) an indication of a ML engine executable package 440. The AMLPG 412 might send this indication of an ML engine executable package if the client or user 402 plans to execute the executable package independent of the automated machine learning pipeline for fraud prevention service 410. The client or user 402 might execute the executable package independent (not shown in FIG. 4) of the automated machine learning pipeline for fraud prevention service 410.

The client or user 402 can analyze the performance metrics 432, and might decide that the performance metrics are not sufficient, and therefore might send another request to the automated machine learning pipeline service 410, with a different dataset and/or different configuration options, to produce another executable package. This can be an iterative process, until the performance metrics 432 show sufficient performance of the ML engine or solution for the client or user 402.

The client or user 402 might send a further request 450 to deploy the executable package that can generate the scores for data points external to the dataset. This further request can be an engine execution request 450. Either with the request or separately, the client or user 402 can send an indication of events 454, such as account credentials and/or transactions, to a machine learning pipeline execution environment 414 of the automated machine learning pipeline service for fraud prevention 410. These account credentials and or transactions might comprise an indication of the other data points for the generated ML engine package. The user or client 402, might also or instead send a data stream or an indication of a data stream to the machine learning pipeline execution environment 414 so that the execution environment can execute the ML engine package whenever data is available to be processed from the data stream. The client or user 402 might send this request and/or the corresponding data using an event verification module 404 that is verifying new (or existing) events as they are created, or as they occur. Some examples of events that an event verification module might verify are transactions and/or account registrations, depending on the embodiment.

The machine learning pipeline execution environment 414 and/or the automated machine learning pipeline for fraud prevention service can provision resources (such as in a provider network) to host the executable package, in some embodiments. It can deploy the executable package to the provisioned resources. It can provide other data points or an indication of other data points to the provisioned resources. It can execute the executable package on the provisioned resources using at least the other data points to produce inference results. It can then providing the inference results to the user, such as scores indicating the potential of fraudulent activity for events 460, where the events might be account registrations or transactions, depending on the embodiment.

Automated Machine Learning Pipeline Generation in a Provider Network

Figure 5:
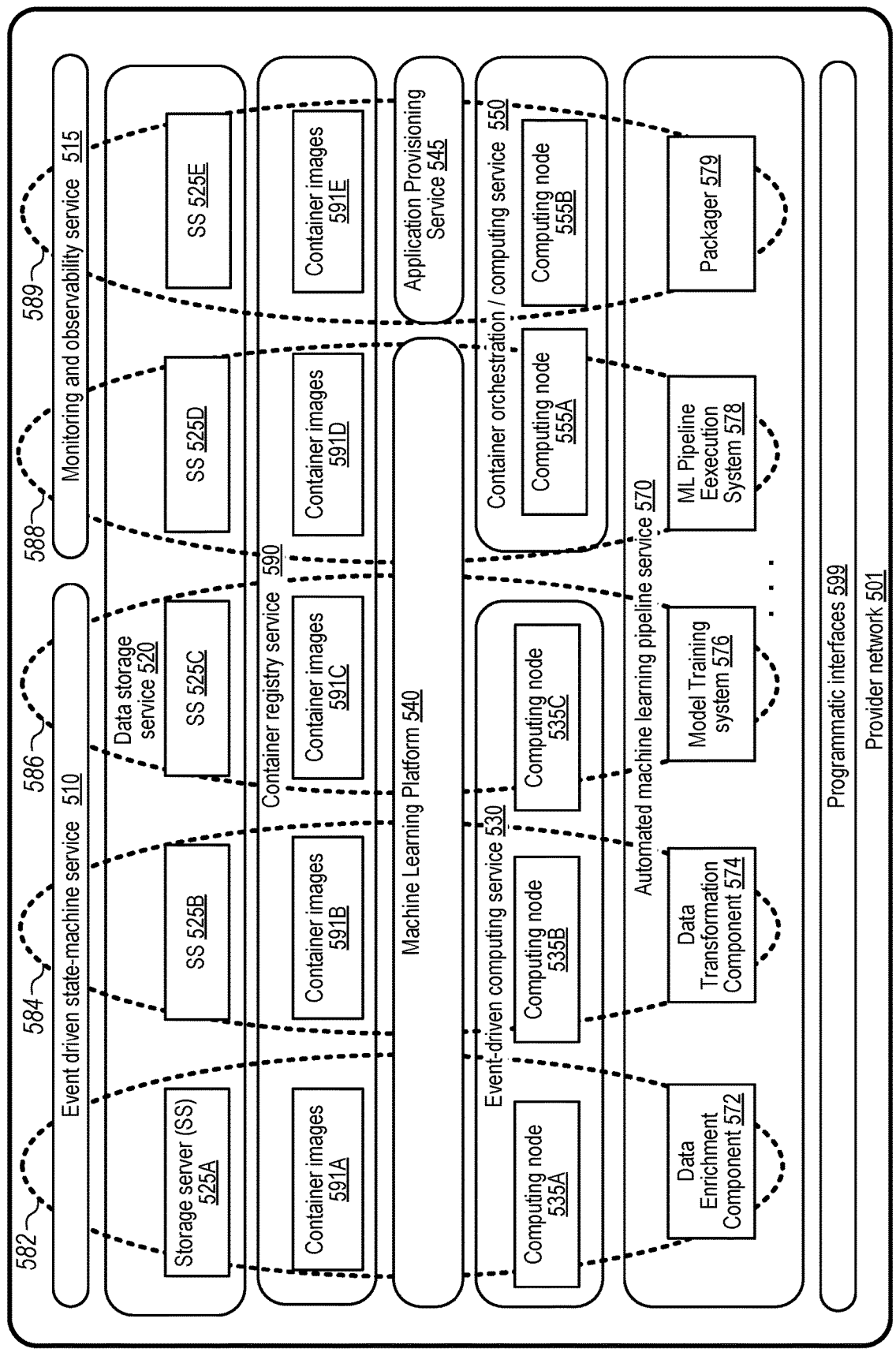
FIG. 5 illustrates an example provider network environment for the automated machine learning pipeline service, where the automated machine learning pipeline service uses services of the provider network to implement its various components and systems, where the provider network includes an event driven state-machine service, a data storage service, an event-driven computing service, a machine learning platform, a virtualized computing service, and a container registry service, according to some embodiments.

FIG. 5 illustrates an example provider network environment for the automated machine learning pipeline service, where the automated machine learning pipeline service uses services of the provider network to implement its various components and systems, where the provider network includes an event driven state-machine service, a data storage service, an event-driven computing service, a machine learning platform, a virtualized computing service, and a container registry service, according to some embodiments.

FIG. 5 illustrates the automated machine learning pipeline service 570 in an example provider network environment 501, according to at least some embodiments. A service provider network 501 may provide computing resources (535A-C, 555A-B) via one or more computing services 550 or event-driven computing services 530 to a client(s) via a programmatic interface 599, in some embodiments. The service provider network 501 may be operated by an entity to provide one or more services, such as various types of cloud-based computing or storage services, accessible via the Internet and/or other networks to client(s). In some embodiments, the service provider network 501 may implement a web server, for example hosting an e-commerce website. Service provider network 501 may include numerous data centers hosting various resource pools, such as collections of physical and/or virtualized computer servers, storage devices, networking equipment and the like, needed to implement and distribute the infrastructure and services offered by the service provider network 501. In some embodiments, service provider network may employ computing resources (535A-C, 555A-B) for its provided services. These computing resources (535A-C, 555A-B) may in some embodiments be offered to client(s) in units called "instances," such as virtual compute instances.

A provider network 501 may provide resource virtualization to clients via one or more virtualization services that allow clients to access, purchase, rent, or otherwise obtain instances of virtualized resources, including but not limited to computation and storage resources (525A-E), implemented on devices within the provider network or networks in one or more data centers. In some embodiments, private IP addresses may be associated with the resource instances; the private IP addresses are the internal network addresses of the resource instances on the provider network 501. In some embodiments, the provider network 501 may also provide public IP addresses and/or public IP address ranges (e.g., Internet Protocol version 4 (IPv4) or Internet Protocol version 6 (IPv6) addresses) that clients may obtain from the provider 501.

Conventionally, the provider network 501, via the virtualization services, may allow a client of the service provider to dynamically associate at least some public IP addresses assigned or allocated to the client with particular resource instances assigned to the client. The provider network 501 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider may, for example, implement client-specific applications and present the client's applications on an intermediate network, such as the Internet. Either the clients or other network entities on the intermediate network may then generate traffic to a destination domain name published by the clients. First, either the clients or the other network entities can make a request through a load balancer for a connection to a compute instance in the plurality of compute instances (555A-B).

The load balancer can responds with the identifying information which might include a public IP address of itself. Then the clients or other network entities on the intermediate network may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 501. A client may then assign their allocated public IP addresses to particular resource instances allocated to the client. These public IP addresses may be referred to as client public IP addresses, or simply client IP addresses. Instead of being assigned by the provider network 501 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 501 may provide a container orchestration and/or computing service 550, or an event-driven compute service 530, implemented by physical server nodes to clients, which includes a plurality of compute instances (535A-C, 555A-B). The compute service also contains many other server instances (555A-B) for many other clients and other users of the provider network 501. As another example, the provider network provides a virtualized data storage service or object storage service 520 which can include a plurality of data storage instances (525A-E) implemented by physical data storage nodes. The data storage service or object storage service 520 can store files for the client, which are accessed through a file access by the appropriate server instance of the client. As another example, the provider network might provide an event driven state-machine service 510 that can interface with the event-driven computing service 530 the data storage service 520, and the container orchestration and/or computing service 550 in order to, for example, provide serverless computing resources for containers of the automated machine learning pipeline service 570. The provider network can also include multiple other client services that pertain to one or more clients or users. The provider network can implement a machine learning platform 540 to train and execute machine learning models. The provider network can also implement an application provisioning service 545, which can, for example, model and provision application resources in a provider network. The provider network can also implement a monitoring and observability service 515 to, for example, monitor applications, respond to system-wide performance changes, optimize resource utilization, and/or get a unified view of operational health. The provider network can also implement a container registry service 590 to package software into standardized units called container images 591A-E that have everything the software needs to run including libraries, system tools, code, and runtime. As another example, the provider network 501 can include a data stream service to clients or users. This data stream service can include a data stream that receives data from a client's data stream and delivers a stream of sensor data to the data storage service 520 for use by the components and systems of the automated machine learning pipeline service 570. The clients may access any one of the client services 510, 515, 520, 530, 540, 545, 550, 570 and 590 for example, via programmatic interface 599, such as one or more APIs to the service, to obtain usage of resources (e.g., data storage instances, or files, or database instances, or server instances) implemented on multiple nodes for the service in a production network portion of the provider network 501.

In the embodiments shown in FIG. 5, some or all of the plurality of computing nodes (535A-C of the event-driven compute service 530 are used to implement the various components of the automated machine learning pipeline service 570, such as the data enrichment component 572 and the data transformation component 574 and the model training system 576. Both components also access storage servers 525 of the data storage service 520 in order, for example, to access the dataset or the data subsets that were the result of data splitting, in some embodiments. Both components can also use the event driven state-machine service 510, in some embodiments, in order to transitions between various operations to prepare the data for use by the model training system, and to prepare recipes that can be packaged as containers, so that data input to the executable package can be properly prepared during inference.

The services of the provider network 501 used by the data enrichment component 572 of the automated machine learning pipeline service 570, in some embodiments, is shown by the dashed oval 582. These services can include, in some embodiments, the event-driven computing service 530, the machine learning platform 540, the container registry service 590, the data storage service 520, and event driven state-machine service 510. The services of the provider network 501 used by the data transformation component 574 of the automated machine learning pipeline service 570, in some embodiments, is shown by the dashed oval 584. These services can include, in some embodiments, the event-driven computing service 530, the machine learning platform 540, the container registry service 590, the data storage service 520, and event driven state-machine service 510. The services used by the model training system 576 of the automated machine learning pipeline service 570, in some embodiments, is shown by the dashed oval 586. These services can include, in some embodiments, the event-driven computing service 530, the machine learning platform 540 to train and execute machine learning models, the container registry service 590, the storage servers 525 of the data storage service 520 to access enriched and transformed training data and/or validation data, and event driven state-machine service 510 to transition between various actions.

The services of the provider network 501 used by the packager 579, in some embodiments is shown by the area encompassed by the dashed oval 589. These can include the container orchestration and/or computing service 550, the application provisioning service 545, the container registry service 590 with container images 591, one or more storage servers 525 of the data storage service 520 to access the recipes and models to be packaged into a container, and the monitoring and observability service 515. After the various containers are packaged into an executable package, the ML pipeline execution system 578 of the automated machine learning pipeline service 570 might use, in some embodiments, the container orchestration and/or computing service 550, the machine learning platform 540, the container registry service 590, the data storage service 520, and the monitoring and observability service 515, to collectively access the executable package and execute it on testing data, or real-time data during inference, as shown by the area encompassed by the dashed oval 588.

Illustrative Methods of an Automated Machine Learning Pipeline Generator

Figure 6:
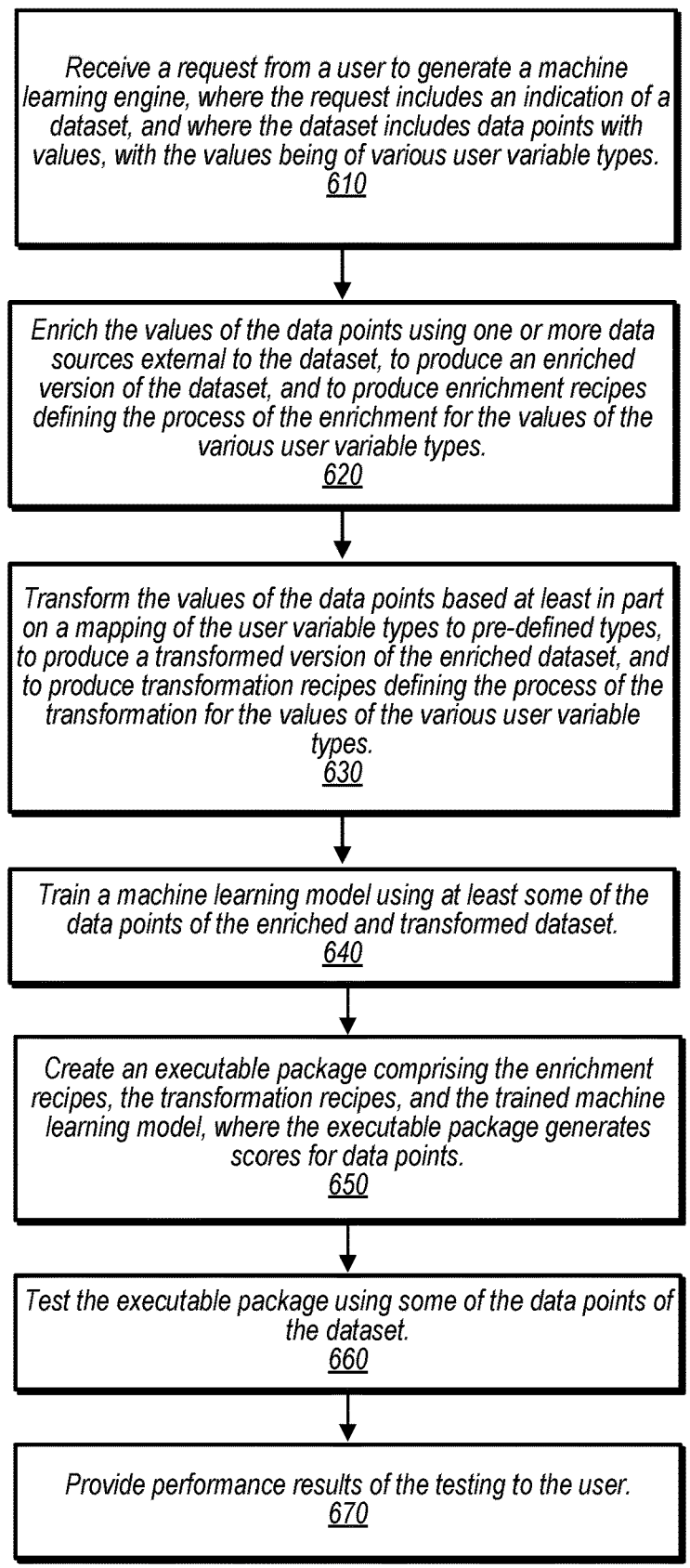
FIG. 6 is a flowchart of an illustrative method that can be implemented by an automated machine learning pipeline generator and/or an automated machine learning pipeline service, where the method receives a request from a user to generate a machine learning engine, the method then enriches an input dataset with one or more data sources external to the dataset, transforms the dataset based on a mapping of pre-defined types to user variable types, trains a machine learning model using the dataset, creates an executable package comprising enrichment recipes, transformation recipes, and the trained machine learning model, tests the executable package, and provides performance results to the user, according to some embodiments.

FIG. 6 is a flowchart of an illustrative method that can be implemented by an automated machine learning pipeline generator and/or an automated machine learning pipeline service, where the method receives a request from a user to generate a machine learning engine, the method then enriches an input dataset with one or more data sources external to the dataset, transforms the dataset based on a mapping of pre-defined types to user variable types, trains a machine learning model using the dataset, creates an executable package comprising enrichment recipes, transformation recipes, and the trained machine learning model, tests the executable package, and provides performance results to the user, according to some embodiments.

The method begins by receiving a request from a user to generate a machine learning engine, where the request includes an indication of a dataset, and where the dataset includes data points with values, with the values being of various user variable types in 610. It then enriches the values of the data points using one or more data sources external to the dataset, to produce an enriched version of the dataset, and to produce enrichment recipes defining the process of the enrichment for the values of the various user variable types at 620. It then transitions to 630 which transforms the values of the data points based at least in part on a mapping of the user variable types to pre-defined types, to produce a transformed version of the enriched dataset, and to produce transformation recipes defining the process of the transformation for the values of the various user variable types. After transforming the values of the data points, then method trains a machine learning model using at least some of the data points of the enriched and transformed dataset in 640. It then creates an executable package comprising the enrichment recipes, the transformation recipes, and the trained machine learning model, where the executable package generates scores for data points in 650. The method tests the executable package using some of the data points of the dataset at 660. Finally, in 670, the method provides performance results of the testing to the user 670.

Figure 7:
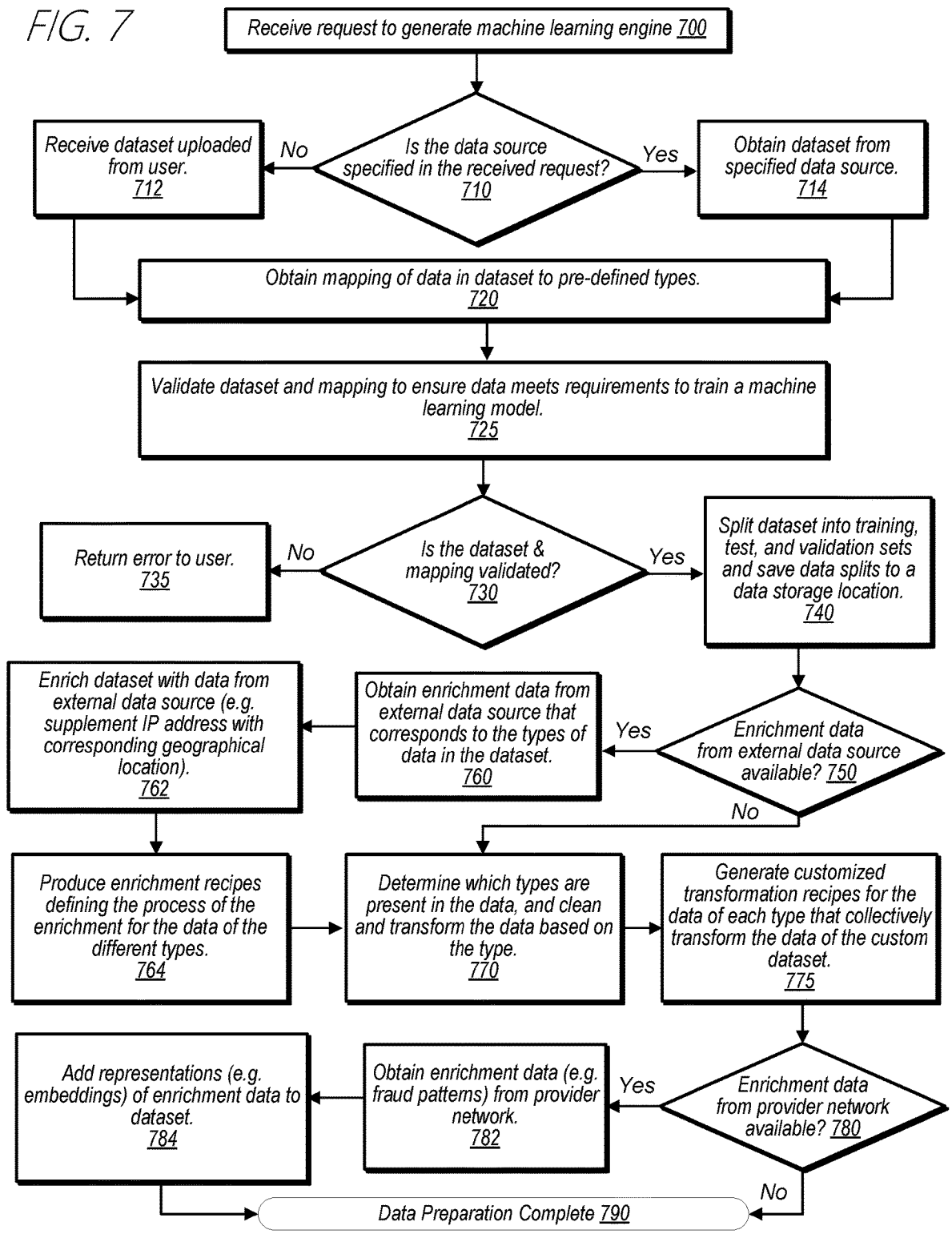
FIG. 7 is a flowchart of an illustrative method that can be implemented by an automated machine learning pipeline generator to prepare data from a user for the machine learning model, where the dataset from the user us first validated, then it is split into different data sets, then enrichment data is obtained from an external data source which is used to enrich the dataset and produce enrichment recipes, where the data is cleaned and transformed and customized transformation recipes are generated based on the types present in the data, and where enrichment data is obtained from a provider network with representations of this enrichment data added to the dataset, according to some embodiments.

FIG. 7 is a flowchart of an illustrative method that can be implemented by an automated machine learning pipeline generator to prepare data from a user for the machine learning model, where the dataset from the user us first validated, then it is split into different data sets, then enrichment data is obtained from an external data source which is used to enrich the dataset and produce enrichment recipes, where the data is cleaned and transformed and customized transformation recipes are generated based on the types present in the data, and where enrichment data is obtained from a provider network with representations of this enrichment data added to the dataset, according to some embodiments.

The flowchart begins by receiving a request to generate a machine learning engine at 700. The flowchart determines whether the data source is specified in the received request at 710. If the data source is specified in the received request, then the flowchart obtains the dataset from specified data source in 714. If the data source is not specified in the received request, then the method receives a dataset uploaded from user in 712. No matter whether the 714 or 712 path is taken, the flowchart transitions to 720 which obtains a mapping of data in the dataset to pre-defined types.

The method then validates the dataset and the mapping to ensure that any data meets certain requirements to train a machine learning model in 725. The flowchart then determines whether the dataset and mapping are validated in 730. If either one is not validated, then the flowchart transitions to 735 and an error is returned to the user. If the dataset and mapping are validated in 730, then the method splits the dataset into training, test, and validation sets and saves the data splits to a data storage location at 740.

The flowchart then determines whether enrichment data from an external data source is available at 750. If enrichment data from an external data source is not available, then the flowchart jumps ahead to 770. If enrichment data from an external data source is available, then the method obtains enrichment data from an external data source that corresponds to the types of data in the dataset at 760. It then enriches the dataset with the data from external data source (e.g. supplements IP address with corresponding geographical location) at 762. The method then produces enrichment recipes defining the process of the enrichment for the data of the different types at 764.

At 770, the flowchart determines which types are present in the data, and cleans and transforms the data based on the type. The method then generates customized transformation recipes for the data of each type that collectively transforms the data of the custom dataset at 775. The flowchart then determines whether enrichment data from the provider network is available at 780. If whether enrichment data from the provider network is not available, then the data preparation is complete 790. If enrichment data from the provider network is available at 780, then the method obtains enrichment data (e.g. fraud patterns) from provider network at 782. This enrichment data can be derived from interactions (such as $3^{rd}$ party interactions) with one or more of the other services provided by the provider network, in some embodiments. After the enrichment data is obtained, then the method adds representations (e.g. embeddings) of enrichment data to dataset at 784. Then the data preparation is complete at 790.

Figure 8:
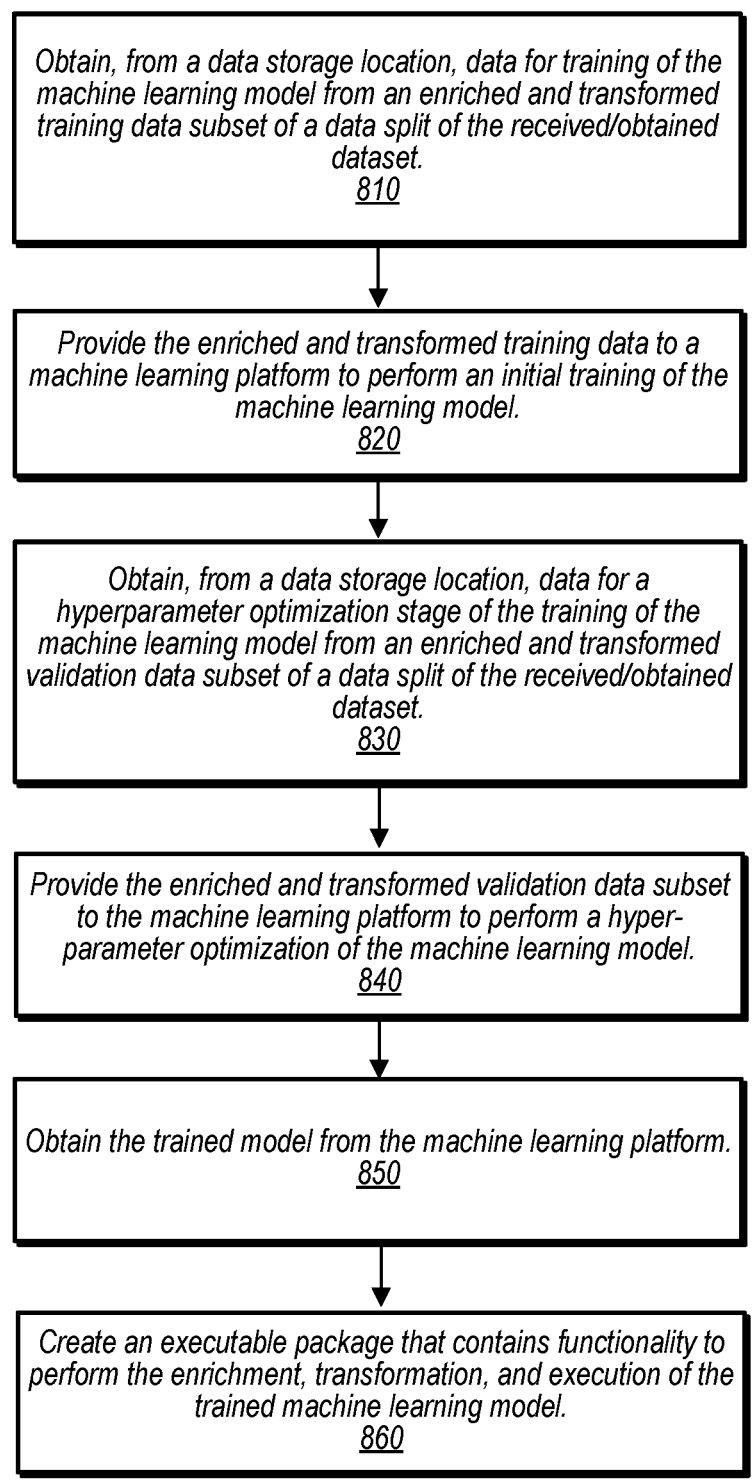
FIG. 8 is a flowchart of an illustrative method that can be implemented by an automated machine learning pipeline generator and/or an automated machine learning pipeline service, where the method obtains training data for training the machine learning model, provides the training data to a machine learning platform to perform an initial training of the machine learning model, obtains validation data for hyper-parameter optimization and provides the validation data to the machine learning platform to perform the hyper-parameter optimization, obtains the trained model from the machine learning platform, and creates an executable package that contains functionality to perform enrichment, transformation, and execution of the trained machine learning model, according to some embodiments.

FIG. 8 is a flowchart of an illustrative method that can be implemented by an automated machine learning pipeline generator and/or an automated machine learning pipeline service, where the method obtains training data for training the machine learning model, provides the training data to a machine learning platform to perform an initial training of the machine learning model, obtains validation data for hyper-parameter optimization and provides the validation data to the machine learning platform to perform the hyper-parameter optimization, obtains the trained model from the machine learning platform, and creates an executable package that contains functionality to perform enrichment, transformation, and execution of the trained machine learning model, according to some embodiments.

The flowchart begins at 810 which obtains, from a data storage location, data for training of the machine learning model from an enriched and transformed training data subset of a data split of the received/obtained dataset. The method transitions to 820 which provides the enriched and transformed training data to a machine learning platform to perform an initial training of the machine learning model. The method then obtains, from a data storage location, data for a hyper-parameter optimization stage of the training of the machine learning model from an enriched and transformed validation data subset of a data split of the received/obtained dataset at 830. The method provides the enriched and transformed validation data subset to the machine learning platform to perform a hyper-parameter optimization of the machine learning model at 840. The method obtains the trained model from the machine learning platform at 850. The flowchart then transitions to 860 which creates an executable package that contains functionality to perform the enrichment, transformation, and execution of the trained machine learning model.

Figure 9:
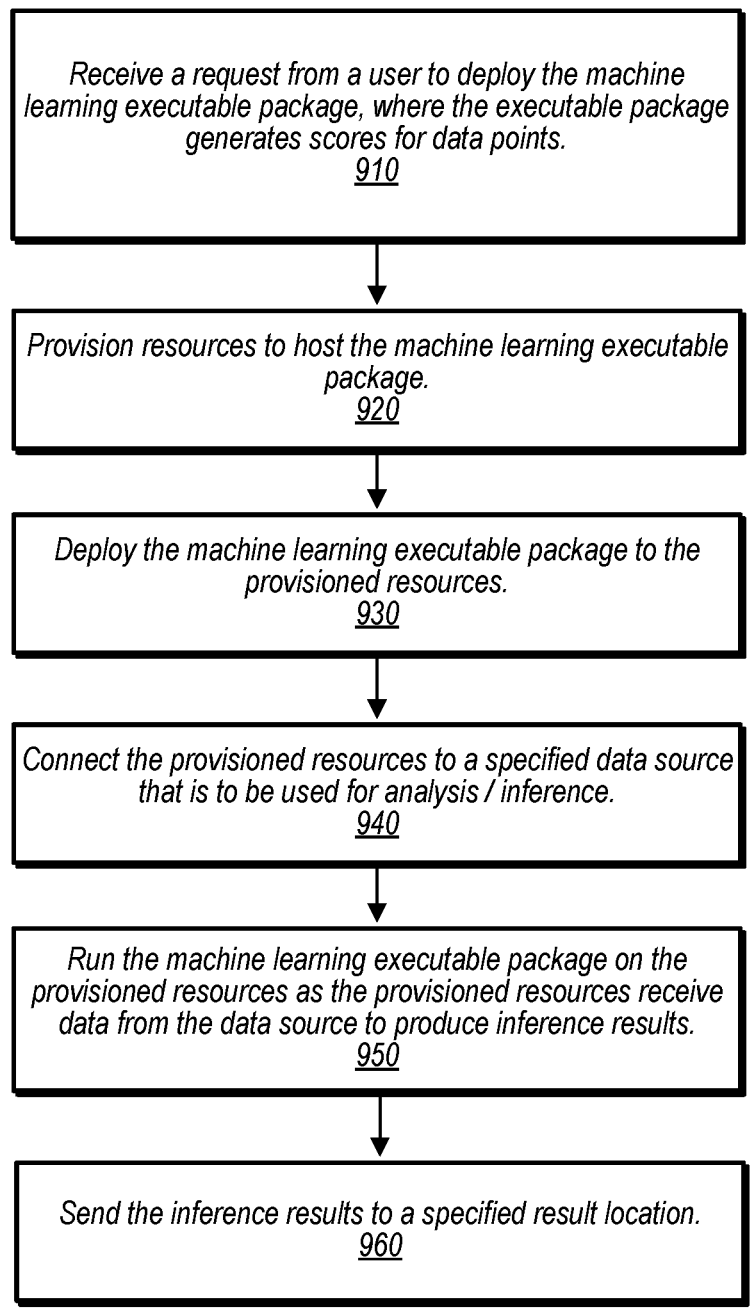
FIG. 9 is a more detailed flowchart of an illustrative method that can be implemented by a machine learning pipeline execution environment and/or an automated machine learning pipeline service, where the method begins by receiving a request from a user to deploy a machine learning executable package, provisions resources to host the machine learning executable package, deploys the machine learning executable package to the provisioned resources, connects the provisioned resources to a data source, runs the machine learning executable package on the provisioned resources, and sends the inference results to a user specified location, according to some embodiments.

FIG. 9 is a more detailed flowchart of an illustrative method that can be implemented by a machine learning pipeline execution environment and/or an automated machine learning pipeline service, where the method begins by receiving a request from a user to deploy a machine learning executable package, provisions resources to host the machine learning executable package, deploys the machine learning executable package to the provisioned resources, connects the provisioned resources to a data source, runs the machine learning executable package on the provisioned resources, and sends the inference results to a user specified location, according to some embodiments. FIG. 9 is simply one example of how an executable package might be executed to produce inference results. In other embodiments, the automated machine learning pipeline service might provide the executable package to the user or client for the user or client to execute independently.

The method begins at 910 which receives a request from a user to deploy the machine learning executable package, where the executable package generates scores for data points. It transitions to 920 which provisions resources to host the machine learning executable package. After provisioning resources, the method deploys the machine learning executable package to the provisioned resources at 930. The method then connects the provisioned resources to a specified data source that is to be used for analysis/inference at 940. The method runs the machine learning executable package on the provisioned resources as the provisioned resources receive data from the data source to produce inference results at 950. Finally the method sends the inference results to a specified result location at 960.

In some embodiments, any of the described systems, services, components, or sensors of a provider network described in one or more of the previous figures may operate within the context of an event-driven execution environment. For example, one or more functions may be assigned to respective events, such that a particular function is triggered in response to detection, by the event-driven execution environment, of an event assigned to the particular function (e.g., receiving data from a user). In embodiments, the function may include one or more operations to process the received data, and may generate a result (e.g., inference).

Illustrative System

Figure 10:
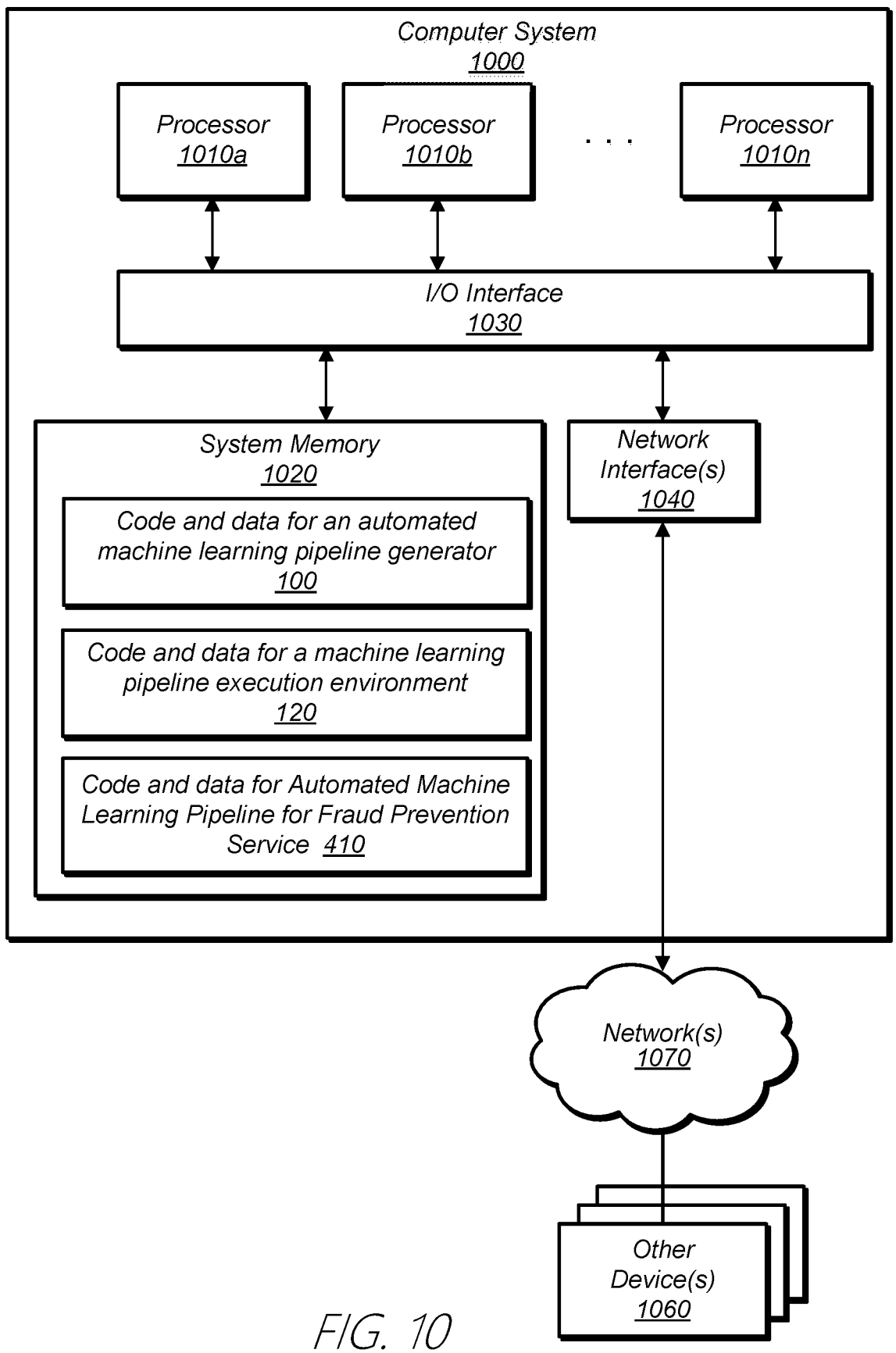
FIG. 10 is a block diagram illustrating an example computer system that may be used for an automated machine learning pipeline generator, a machine learning pipeline execution platform and/or an automated machine learning pipeline service, according to some embodiments.

FIG. 10 is a block diagram illustrating an example computer system that may be used for an automated machine learning pipeline generator, a machine learning pipeline execution platform and/or an automated machine learning pipeline service, according to some embodiments.

In at least some embodiments, a computer that implements a portion or all of the methods and apparatus for an automated machine learning pipeline generator, a machine learning pipeline execution platform and/or an automated machine learning pipeline service as described herein may include a general-purpose computer system or computing device that includes or is configured to access one or more computer-accessible media, such as computer system 1000 illustrated in FIG. 10. FIG. 10 is a block diagram illustrating an example computer system that may be used in some embodiments. This computer system can be used as an automated machine learning pipeline generator (100, 200, 412), a machine learning pipeline execution platform (120, 220, 414) and/or an automated machine learning pipeline service (410), or as a backend resource host which executes one or more of backend resource instances or one or more of the plurality of compute instances (555A-B) in the container orchestration and compute service (550) or one or more of the plurality of server instances (535A-D) in the event driven compute service (530). In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an apparatus and method of an automated machine learning pipeline generator, a machine learning pipeline execution platform and/or an automated machine learning pipeline service, are shown stored within system memory 1020 as the code and data for an automated machine learning pipeline generator 100, the code and data for a machine learning pipeline execution environment 120 and/or the code and data for an automated machine learning pipeline for fraud prevention service 410.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1-6, for example. In various embodiments, network interface

1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing an automated machine learning pipeline generator, a machine learning pipeline execution platform and/or an automated machine learning pipeline service. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Any of various computer systems may be configured to implement processes associated with the provider network, the automated machine learning pipeline generator, the machine learning pipeline execution platform, the automated machine learning pipeline service, or any other component of the above figures. In various embodiments, the provider network, the automated machine learning pipeline generator, the machine learning pipeline execution platform, the automated machine learning pipeline service, or any other component of any of FIGS. 1-9 may each include one or more computer systems 1000 such as that illustrated in FIG. 10. In embodiments, provider network, the automated machine learning pipeline generator, the machine learning pipeline execution platform, the automated machine learning pipeline service, or any other component may include one or more components of the computer system 1000 that function in a same or similar way as described for the computer system 1000.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computers comprising one or more processors and memory and configured to implement an automated machine learning pipeline service configured to:
provide an interface for a plurality of clients to request automated generation of machine learning engines based on datasets;
receive a request from a client via the interface to generate a machine learning engine;
receive information via the interface, wherein the information comprises an indication of a dataset, wherein the dataset comprises a plurality of data points and a plurality of user variable types, wherein individual data points comprise one or more values for a respective one or more of the user variable types such that the dataset collectively comprises a plurality of values for individual ones of the plurality of user variable types, and wherein the information further comprises an indication of a mapping of the individual ones of the user variable types to pre-defined types; and
responsive to the receipt of the request to generate the machine learning engine via the interface, the automated machine learning pipeline service is further configured to:
enrich at least some of the one or more values of at least some of the individual data points of the dataset using one or more data sources external to the dataset, to produce an enriched version of the dataset, and to produce enrichment recipes defining the process of the enrichment for the values of the individual user variable types;
transform at least some of the one or more values of at least some of the individual data points of the dataset based at least in part on the pre-defined types of the respective individual ones of the user variable types, to produce a transformed version of the enriched dataset, and to produce transformation recipes defining the process of the transformation for the values of the individual user variable types;
train a machine learning model using at least some of the data points of the enriched and transformed dataset; and
compose an executable package comprising an enrichment component based at least in part on the enrichment recipes, a transformation component based at least in part on the transformation recipes, and the trained machine learning model, wherein the executable package is configured to generate scores for at least other data points external to the dataset.

2. The system as recited in claim 1, wherein the automated machine learning pipeline service is provided by a provider network that provides one or more other services in addition to the automated machine learning pipeline service, and wherein the automated machine learning pipeline service is further configured to:

add additional data of the provider network to the dataset, wherein the additional data is based at least in part on interactions with one or more of the other services provided by the provider network.

3. The system as recited in claim 1, wherein the executable package is an executable package for fraud prevention, wherein the individual data points comprise information associated with a customer or transaction, wherein the generated scores comprise a likelihood that the respective other data points are fraudulent, and wherein the plurality of user variable types comprise at least an email address type, and a source IP address type.

4. The system as recited in claim 1, wherein the automated machine learning pipeline service is further configured to:

split the plurality of data points of the dataset into at least two subsets comprising a training subset and a testing subset; and test the executable package using the testing subset of data points;

wherein to train the machine learning model using the at least some of the enriched and transformed data points of dataset, the automated machine learning pipeline service is further configured to:

train the machine learning model using enriched and transformed data points of the training subset.

5. A method, comprising:

enriching at least some values of at least some of a plurality of data points of a dataset using one or more data sources external to the dataset to produce an enriched version of the dataset, wherein the dataset comprises a plurality of user variable types, wherein individual data points of the dataset comprise one or more values for a respective one or more of the user variable types such that the dataset collectively comprises a plurality of values for individual ones of the plurality of user variable types, and wherein the enriching further produces enrichment recipes defining the process of the enrichment for the values of the individual user variable types;

transforming at least some of the values of at least some of the plurality of data points based at least in part on a mapping of the individual ones of the user variable types to respective pre-defined types, to produce a transformed version of the enriched dataset, and to produce transformation recipes defining the process of the transformation for the values of the individual user variable types;

training a machine learning model using at least some of the data points of the transformed and enriched dataset; and composing an executable package comprising an enrichment component based at least in part on the enrichment recipes, a transformation component based at least in part on the transformation recipes, and the trained machine learning model, that generates scores for at least other data points external to the dataset.

6. The method as recited in claim 5, further comprising:

receiving a request from a user to create the executable package that generates the scores for at least the other data points external to the dataset, wherein the enriching, the transforming, the training and the composing are performed in response to the received request;

testing the executable package; and providing performance results of the testing to the user.

7. The method as recited in claim 6, further comprising:

receiving a further request from the user to deploy the executable package that generates the scores for at least the other data points external to the dataset, where the request comprises an indication of the other data points;

provisioning resources in a provider network to host the executable package;

deploying the executable package to the provisioned resources;

providing the other data points or an indication of the other data points to the provisioned resources;

executing the executable package on the provisioned resources using at least the other data points to produce inference results; and providing the inference results to the user.

8. The method as recited in claim 5, wherein the enriching the at least some values of the at least some of the plurality of data points of the dataset using the one or more data sources external to the dataset further comprises:

enriching at least one of the values with a high cardinality with one or more additional values comprising either a lower cardinality or numerical or continuous variables from at least one of the data sources external to the dataset.

9. The method as recited in claim 5, wherein the enriching, the transforming, the training and the composing are performed by an automated machine learning pipeline service of a provider network that provides one or more other services in addition to the automated machine learning pipeline service, further comprising:

adding additional data of the provider network to the dataset, wherein the additional data is based at least in part on interactions with one or more of the other services provided by the provider network.

10. The method as recited in claim 9, wherein the automated machine learning pipeline service is for fraud prevention, wherein the individual data points comprise information associated with a customer or transaction, wherein the generated scores comprise a likelihood that the respective other data points are fraudulent, and wherein the plurality of user variable types comprise at least an email address type, and a source IP address type.

11. The method as recited in claim 10, wherein the enriching the at least some values of the at least some of a plurality of data points of the dataset further comprises:

generating multiple additional attributes for the values of at least the source IP address type using the data sources external to the dataset.

12. The method as recited in claim 5, further comprising:

splitting the plurality of data points of the dataset into at least two subsets comprising a training subset and a testing subset; and testing the executable package using the testing subset of data points;

wherein the training the machine learning model using the at least some of the data points of the transformed and enriched dataset further comprises:

training the machine learning model using the training subset of data points.

13. The method as recited in claim 5, wherein the training the machine learning model using the at least some of the data points of the transformed and enriched dataset further comprises:

tuning one or more hyperparameters for the machine learning model using at least other data points different from the at least some of the data points of the dataset.

14. One or more non-transitory computer-readable storage media storing program instructions, that when executed on or across one or more processors of an automated machine learning pipeline generator, cause the one or more processors to:
- enrich at least some values of at least some of a plurality of data points of a dataset using one or more data sources external to the dataset to produce an enriched version of the dataset, wherein the dataset comprises a plurality of user variable types, wherein individual data points of the dataset comprise one or more values for a respective one or more of the user variable types such that the dataset collectively comprises a plurality of values for individual ones of the plurality of user variable types, and wherein the enriching further produces enrichment recipes defining the process of the enrichment for the values of the individual user variable types;
- transform at least some of the values of at least some of the plurality of data points based at least in part on a mapping of the individual ones of the user variable types to respective pre-defined types, to produce a transformed version of the enriched dataset, and to produce transformation recipes defining the process of the transformation for the values of the individual user variable types;
- train a machine learning model using at least some of the data points of the transformed and enriched dataset; and
- compose an executable package comprising an enrichment component based at least in part on the enrichment recipes, a transformation component based at least in part on the transformation recipes, and the trained machine learning model, that generates scores for at least other data points external to the dataset.

15. The one or more non-transitory computer-readable storage media of claim 14, wherein the program instructions further cause the one or more processors of the automated machine learning pipeline generator to:
- receive a request from a user to create the executable package that generates the scores for at least the other data points external to the dataset, wherein the enriching, the transforming, the training and the composing are performed in response to the received request;
- test the executable package; and
- provide performance results of the testing to the user.

16. The one or more non-transitory computer-readable storage media of claim 15, wherein the program instructions further cause the one or more processors of the automated machine learning pipeline generator to:
- receive a further request from the user to deploy the executable package that generates the scores for at least the other data points external to the dataset, where the request comprises an indication of the other data points;
- provision resources in a provider network to host the executable package;
- deploy the executable package to the provisioned resources;
- provide the other data points or an indication of the other data points to the provisioned resources;
- execute the executable package on the provisioned resources using at least the other data points to produce inference results; and
- provide the inference results to the user.

17. The one or more non-transitory computer-readable storage media of claim 14, wherein the automated machine learning pipeline generator is a service of a provider network that provides one or more other services in addition to the automated machine learning pipeline generator, and wherein the program instructions further cause the one or more processors of the automated machine learning pipeline generator to:
- add additional data of the provider network to the dataset, wherein the additional data is based at least in part on interactions with one or more of the other services provided by the provider network.

18. The one or more non-transitory computer-readable storage media of claim 14, wherein the automated machine learning pipeline generator is for fraud prevention, wherein the individual data points comprise information associated with a customer or transaction, wherein the generated scores comprise a likelihood that the respective other data points are fraudulent, and wherein the plurality of user variable types comprise at least an email address type, and a source IP address type.

19. The one or more non-transitory computer-readable storage media of claim 18, wherein to enrich the at least some values of the at least some of a plurality of data points of the dataset, the program instructions further cause the one or more processors of the automated machine learning pipeline generator to:
- generate multiple additional attributes for the values of at least the source IP address type using the data sources external to the dataset.

20. The one or more non-transitory computer-readable storage media of claim 14, wherein the program instructions further cause the one or more processors of the automated machine learning pipeline generator to:
- split the plurality of data points of the dataset into at least three subsets comprising a training subset, a validation subset and a testing subset; and
- test the executable package using the testing subset of data points;
- wherein to train the machine learning model using the at least some of the data points of the transformed and enriched dataset, the program instructions further cause the one or more processors of the automated machine learning pipeline generator to:
  - train the machine learning model using the training subset of data points; and
  - tune one or more hyper-parameters for the machine learning model using the validation subset of data points.

* * * * *